US008709544B2

(12) United States Patent
Neu et al.

(10) Patent No.: US 8,709,544 B2
(45) Date of Patent: Apr. 29, 2014

(54) CATALYSTS FOR POLYURETHANE COATING COMPOUNDS

(75) Inventors: Oliver Neu, Bobenheim-Roxheim (DE); Michael Siemer, Mannheim (DE); Ansgar Gereon Altenhoff, Heidelberg (DE); Harald Schaefer, Mannheim (DE); Angelika Maria Steinbrecher, Stuttgart (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/511,051

(22) PCT Filed: Nov. 22, 2010

(86) PCT No.: PCT/EP2010/067876
§ 371 (c)(1),
(2), (4) Date: May 21, 2012

(87) PCT Pub. No.: WO2011/061314
PCT Pub. Date: May 26, 2011

(65) Prior Publication Data
US 2012/0288632 A1  Nov. 15, 2012

(30) Foreign Application Priority Data
Nov. 23, 2009  (EP) .................................... 09176785

(51) Int. Cl.
*B05D 3/02* (2006.01)
(52) U.S. Cl.
USPC ........ 427/385.5; 427/379; 524/106; 524/589; 524/590
(58) Field of Classification Search
None
See application file for complete search history.

(56) References Cited

U.S. PATENT DOCUMENTS

| | | | |
|---|---|---|---|
| 4,596,678 A | 6/1986 | Merger et al. | |
| 4,596,679 A | 6/1986 | Hellbach et al. | |
| 5,087,739 A | 2/1992 | Bohmholdt et al. | |
| 5,329,003 A * | 7/1994 | Bruchmann | 540/202 |
| 2005/0137298 A1 | 6/2005 | Schneider | |
| 2008/0226912 A1 | 9/2008 | Norlin et al. | |
| 2008/0226913 A1* | 9/2008 | Cattron et al. | 428/392 |
| 2008/0262186 A1* | 10/2008 | Louie et al. | 528/53 |
| 2010/0221474 A1 | 9/2010 | Prissok et al. | |
| 2010/0249432 A1 | 9/2010 | Siemer et al. | |
| 2010/0283003 A1 | 11/2010 | Siemer et al. | |
| 2011/0201709 A1* | 8/2011 | Athey et al. | 521/128 |
| 2011/0263810 A1 | 10/2011 | Siemer et al. | |
| 2013/0109806 A1 | 5/2013 | Schaefer et al. | |

FOREIGN PATENT DOCUMENTS

| | | |
|---|---|---|
| DE | 100 13 186 | 9/2001 |
| DE | 100 13 187 | 10/2001 |
| DE | 10 2005 057 853 | 6/2007 |
| DE | 10 2008 026 341 | 11/2009 |
| EP | 0 126 299 | 11/1984 |
| EP | 0 126 300 | 11/1984 |
| EP | 0 355 443 | 2/1990 |
| EP | 0 403 921 | 12/1990 |
| EP | 1 389 221 | 2/2004 |
| JP | 2006 152154 | 6/2006 |
| JP | 2008 201703 | 9/2008 |
| WO | 03 093246 | 11/2003 |
| WO | 2005 087828 | 9/2005 |
| WO | 2005 089085 | 9/2005 |
| WO | 2006 084880 | 8/2006 |
| WO | 2007 039133 | 4/2007 |
| WO | 2007 062953 | 6/2007 |
| WO | 2007 090755 | 8/2007 |
| WO | 2008 006422 | 1/2008 |
| WO | 2008 068198 | 6/2008 |
| WO | 2008 076302 | 6/2008 |
| WO | 2008 076303 | 6/2008 |
| WO | 2008 116893 | 10/2008 |
| WO | 2008 116894 | 10/2008 |
| WO | 2008 116895 | 10/2008 |
| WO | 2008 133668 | 11/2008 |
| WO | 2009 010502 | 1/2009 |
| WO | 2009 016322 | 2/2009 |
| WO | 2009 027250 | 3/2009 |
| WO | 2009 040242 | 4/2009 |
| WO | 2009 074535 | 6/2009 |
| WO | 2009 074538 | 6/2009 |
| WO | 2010 072571 | 7/2010 |

OTHER PUBLICATIONS

Bantu, B., et al., "$CO_2$, Magnesium, Aluminum, and Zinc Adducts of N-Heterocyclic Carbenes as (Latent) Catalysts for Polyurethane Synthesis," European Journal of Inorganic Chemistry, pp. 1970-1976, (2009).
Bantu, B., et al., "$CO_2$ and $Sn^{II}$ Adducts of N-Heterocyclic Carbenes as Delayed-Action Catalysts for Polyurethane Synthesis," Chem. Eur. J., vol. 15, pp. 3103-3109, (2009).
Mallakpour, S., et al., "Reaction of Aromatic Carboxylic Acids with Isocyanates using Ionic Liquids as Novel and Efficient Media," J. Braz. Chem. Soc., vol. 18, No. 6, pp. 1220-1223, (2007).
International Search Report Issued Feb. 2, 2011 in PCT/EP10/67876 Filed Nov. 22, 2010.
U.S. Appl. No. 13/889,603, filed May 8, 2013, Lucas, et al.

* cited by examiner

*Primary Examiner* — Erma Cameron
(74) *Attorney, Agent, or Firm* — Oblon, Spivak, McClelland, Maier & Neustadt, L.L.P.

(57) ABSTRACT

The present invention relates to coating compositions for polyurethane coating materials that feature new catalysts.

20 Claims, No Drawings

CATALYSTS FOR POLYURETHANE COATING COMPOUNDS

CROSS REFERENCE TO RELATED APPLICATIONS

This application is a 35 U.S.C. §371 national stage patent application of international patent application PCT/EP10/067,876, filed Nov. 22, 2010, and claims the benefit of the European Patent Application No. EP 09176785.5, filed Nov. 23, 2009.

The present invention relates to new catalysts for curing coating compositions from solvent-based 2-component polyurethane coating materials.

In order to accelerate the curing of coating compositions for polyurethane coating materials it is possible to add to them, as catalysts for the reaction of isocyanate groups and polyol groups, a multiplicity of metal compounds, especially heavy metal compounds. A substitute for these compounds is sought for reasons of toxicology and/or of occupational health and hygiene. Particularly critical from a toxicological standpoint are organotin compounds, especially dialkyltin compounds, more particularly dibutyltin dilaurate (DBTL).

WO 2008/076302 describes radiation-curable coating compositions comprising polyurethane acrylate oligomers obtained by reacting isocyanates with alcohols. Among the catalysts mentioned, within long lists, are imidazolium salts such as 1-butyl-3-methylimidazolium acetate. Used explicitly in the examples is dibutyltin dilaurate. The specific substitution of toxic Lewis acids such as dibutyltin dilaurate and the achievement of a preferred curing behavior of isocyanates with polyols are not described. Moreover, the preparation only of polyurethane prepolymers is described, but not the curing of polyurethane coating materials. The disclosure content of WO 2008/133668 is similar, it likewise describing polyurethane prepolymers formed from polyisocyanates and polyalkylene glycols with an Mn of 300 to 5000.

WO 2007/090755 and WO 2009/010502 describe polyurethanes formulated to have antistatic properties using ionic liquids such as ethylmethylimidazolium ethylsulfate, for example. The ionic liquid ethylmethylimidazolium ethylsulfate functions here exclusively as an antistat, to increase the conductivity of the polymer. There is a functionally and substantively separate listing of customary catalysts for the reaction of polyisocyanate and polyol to form polyurethanes. Although ethylmethylimidazolium ethylsulfate is present when the polyurethane is formed, there is no indication of any possible catalytic effect in the preparation of polyurethanes, and more particularly no reference to coating materials or coating-material properties.

WO 2003/093246 describes ionic liquids comprising ammonium or phosphonium cations and an anion of a five-membered nitrogen heteroaromatic as a solvent and catalyst for the oligomerization of isocyanates. In that reaction, monomeric isocyanates are reacted with themselves in a cyclization reaction to form their oligomers, dimers (uretdione), and trimers (isocyanurate, iminooxadiazinedione).

Nitrogen heteroaromatic cations as a component of ionic liquids are not described. Similarly, EP 1389221 describes the use of triazolate structures for the reaction of isocyanate groups with other isocyanate groups.

WO 2006/084880 describes the at least partial oligomerization of diisocyanates for preparing polyisocyanates comprising isocyanurate groups, biuret groups or allophanate groups, in the presence of at least one oligomerization catalyst, which is an ionic liquid, imidazolium cations among others. Suitability as urethanization catalysts, and advantages in the context of the operation of curing polyisocyanates and polyols in a coating-material application, or coating-material applications per se, are not described.

WO 2007/062953 claims aqueous resin dispersions obtainable by reacting hydroxyl-containing ketone resins, ketone/aldehyde resins, urea/aldehyde resins or their hydrogenated derivatives and at least one di- or polyisocyanate and at least one ionic liquid which has a function that is reactive toward isocyanate groups, and which possesses additional functional groups, and subsequently combining the resin with water.

The ionic liquids that can be incorporated are employed as emulsifiers and serve for functionalization and also for conversion of organic resins into stable aqueous solutions, dilutions, and dispersions.

Disclosed differently and separately therefrom in functional terms are conventional catalysts for the reaction of the above components.

There is no reference to any possible catalytic effect of the ionic liquids, to any substitution of toxic catalysts such as DBTL, or to any possible use in solventborne 2-component polyurethane coating materials having good curing behavior and good coating-material properties.

WO 2008/006422 describes the use of ionic liquids of metal salts in ionic liquids as antistats in plastics.

For the preparation of polyurethanes by reaction of polyol and polyisocyanate in the presence of ionic liquids, the customary urethanization catalyst triethylenediamine is described.

There is no reference to any possible catalytic effect of the ionic liquids on the urethanization reaction, or to advantages in connection with preparation of or use in coating materials.

WO 2009/016322 describes a process for preparing urethanes from isocyanates and hydroxy compounds in the presence of a carbene as catalyst for the substitution of toxic metal catalysts.

The catalytically active species are explicitly carbenes on the C2 carbon of the imidazolium ring that can be used in isolation or in situ.

The use of imidazolium salts as a catalyst for the urethanization reaction, the reaction of polyisocyanates and polyols to form coating materials, and, optionally, advantages in connection with curing to form coating materials, are not described.

Buchmeiser et al, Eur. J. Inorg. Chem. 2009, 1970-1976 describe the use of $CO_2$ and adducts of magnesium, of aluminum, and of zinc with N-heterocyclic carbenes as (latent) catalysts in polyurethane synthesis. These catalysts require a separate synthesis step and have to be handled under nitrogen in a glove box, which is costly and inconvenient and which disqualifies them from practical application. Moreover, these catalysts require elevated temperatures, which makes room-temperature curing impossible.

Buchmeiser et al, Chem. Eur. J. 2009, 15, 3103-3109 describe organotin(II) adducts with N-heterocyclic imidazolium carbenes as pronouncedly latent (delayed-action) catalysts. Scheme 2 depicts a mechanism of action which compares the carbenes as catalytically active species with the catalytically inactive imidazolium ions.

JP 2008201703 describes imidazolium salts for use in drugs, crop protection compositions, and electrolyte solutions, and as catalysts for the curing of resins formed from epoxides and polyurethanes, but this is not supported by any explicit example. There is no reference to a catalytic activity of the imidazolium salts thus prepared for the reaction of polyisocyanates and polyols for use in coating materials, or to alternative use in relation to the customary Lewis acid catalysts such as DBTL.

JP 2006152154 describes the use of ionic liquids in binders and their use in pressure-sensitive adhesive layers for electronic components with antistatic properties. One example given of an ionic liquid, among others, is 1-methyl-3-butyl-imidazolium halide. Also disclosed is a reaction of a polyacrylateol with a polyisocyanate. Catalytic properties of the ionic liquids are not described, and nor is the improvement of curing properties or the application of coating materials, or use in polyisocyanates or mixtures of polyisocyanates and polyols directly prior to application.

Journal of the Brazilian Chemical Society, 2009, 18(6), 1220-1223, describes the amidation of isocyanates with aromatic carboxylic acids in the presence of ionic liquids as a reaction medium. As compared with other solvents such as N,N-dimethyl-formamide, N-methylpyrrolidone, and toluene, higher yields are obtained, and a positive effect of the ionic liquids is cited. The reaction in principle of isocyanates with amines, alcohols, and acids, however, is disclosed only generally and not explicitly. The ionic liquids as solvents may replace catalysts in the reactions.

A disadvantage is that the stated halides may induce corrosion in the case of coating materials on metal substrates.

It was an object of the present invention to develop new catalysts for coating with 2-component polyurethane coating materials that are able to replace the customary organometallic catalysts, more particularly organotin compounds, of the prior art and that, in addition, produce improved curing and/or coating properties.

Probably the most widespread such compound in the art is currently DBTL, which has adverse toxic properties in a variety of respects.

This object has been achieved by means of a method of coating substrates with coating compositions, comprising
in a first step coating the substrate with at least one coating composition comprising
(A) at least one polyisocyanate obtainable by reacting at least one monomeric isocyanate,
(B) at least one compound which has at least two isocyanate-reactive groups, a number-average molecular weight Mn of at least 1000 g/mol, and an OH number of 40 to 350 mg KOH/g,
(C) at least one imidazolium salt,
(D) optionally at least one solvent,
(E) optionally at least one urethanization catalyst other than (C), and
(F) optionally other, typical coatings components and/or additives,
said imidazolium salt (C) having the formula

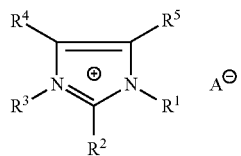

in which $R^1$ and $R^3$ independently of one another are an organic radical having 1 to 20 C atoms,
$R^2$, $R^4$ and $R^5$ independently of one another are an H atom or an organic radical having up to 20 C atoms and $A^-$ is an anion,
optionally drying the coating composition applied to the substrate, followed by
curing the coating composition applied to the substrate.

With these coating compositions it is possible to obtain coatings having properties that are at least comparable with those formed using organometallic catalysts.

As compared with curing with comparable quantities of DBTL, curing can be accomplished at lower curing temperatures and/or in shorter curing times. By comparable quantity of DBTL is meant that, in direct, realistic comparison, similar processing times are set. A preferred measure of the processing time is the same gel time (see Examples).

A feature of the method of the invention is that high hardness on the part of the coating-material system is achieved even at low curing temperatures. The hardness exceeds the values achieved with common catalysts, especially DBTL, with no deterioration in processing time.

Polyisocyanates (A)

The monomeric isocyanates used for preparing the polyisocyanates may be aromatic, aliphatic or cycloaliphatic, preferably aliphatic or cycloaliphatic, referred to for short in this specification as (cyclo)aliphatic; aliphatic isocyanates are particularly preferred.

Aromatic isocyanates are those which comprise at least one aromatic ring system, in other words not only purely aromatic compounds but also araliphatic compounds.

Cycloaliphatic isocyanates are those which comprise at least one cycloaliphatic ring system.

Aliphatic isocyanates are those which comprise exclusively linear or branched chains, i.e., acyclic compounds.

The monomeric isocyanates are preferably diisocyanates, which carry precisely two isocyanate groups. They can, however, in principle also be monoisocyanates, having one isocyanate group.

In principle, higher isocyanates having on average more than 2 isocyanate groups are also contemplated. Suitability therefor is possessed for example by triisocyanates such as triisocyanatononane, 2'-isocyanatoethyl 2,6-diisocyanatohexanoate, 2,4,6-triisocyanatotoluene, triphenylmethane triisocyanate or 2,4,4'-triisocyanatodiphenyl ether, or the mixtures of diisocyanates, triisocyanates, and higher polyisocyanates that are obtained, for example, by phosgenation of corresponding aniline/formaldehyde condensates and represent methylene-bridged polyphenyl polyisocyanates.

These monomeric isocyanates do not contain any substantial products of reaction of the isocyanate groups with themselves.

The monomeric isocyanates are preferably isocyanates having 4 to 20 C atoms. Examples of typical diisocyanates are aliphatic diisocyanates such as tetramethylene diisocyanate, pentamethylene 1,5-diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate (e.g., methyl 2,6-diisocyanatohexanoate or ethyl 2,6-diisocyanatohexanoate), trimethylhexane diisocyanate or tetramethylhexane diisocyanate, cycloaliphatic diisocyanates such as 1,4-, 1,3- or 1,2-diisocyanato-cyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis-(isocyanatomethyl)cyclohexane or 2,4-, or 2,6-diisocyanato-1-methylcyclohexane, and also 3 (or 4), 8 (or 9)-bis(isocyanatomethyl)tricyclo [5.2.1.0$^{2.6}$]decane isomer mixtures, and also aromatic diisocyanates such as tolylene 2,4- or 2,6-diisocyanate and the isomer mixtures thereof, m- or p-xylylene diisocyanate, 2,4'- or 4,4'-diisocyanato-diphenylmethane and the isomer mixtures thereof, phenylene 1,3- or 1,4-diisocyanate, 1-chlorophenylene 2,4-diisocyanate, naphthylene 1,5-diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or diphenyl ether 4,4'-diisocyanate.

Particular preference is given to hexamethylene 1,6-diisocyanate, 1,3-bis(isocyanatomethyl)cyclohexane, isophorone diisocyanate, and 4,4'- or 2,4'-di(isocyanatocyclohexyl)methane, very particular preference to isophorone diisocyanate and hexamethylene 1,6-diisocyanate, and especial preference to hexamethylene 1,6-diisocyanate.

Mixtures of said isocyanates may also be present.

Isophorone diisocyanate is usually in the form of a mixture, specifically a mixture of the cis and trans isomers, generally in a proportion of about 60:40 to 90:10 (w/w), preferably of 70:30 to 90:10.

Dicyclohexylmethane 4,4'-diisocyanate may likewise be in the form of a mixture of the different cis and trans isomers.

For the present invention it is possible to use not only those diisocyanates obtained by phosgenating the corresponding amines but also those prepared without the use of phosgene, i.e., by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087,739), for example, (cyclo)aliphatic diisocyanates, such as hexamethylene 1,6-diisocyanate (HDI), isomeric aliphatic diisocyanates having 6 carbon atoms in the alkylene radical, 4,4'- or 2,4'-di(isocyanatocyclohexyl)methane, and 1-isocyanato-3-isocyanatomethyl-3,5,5-trimethylcyclohexane (isophorone diisocyanate or IPDI) can be prepared by reacting the (cyclo)aliphatic diamines with, for example, urea and alcohols to give (cyclo)aliphatic biscarbamic esters and subjecting said esters to thermal cleavage into the corresponding diisocyanates and alcohols. The synthesis takes place usually continuously in a circulation process and in the presence, if appropriate, of N-unsubstituted carbamic esters, dialkyl carbonates, and other by-products recycled from the reaction process. Diisocyanates obtained in this way generally contain a very low or even unmeasurable fraction of chlorinated compounds, which is advantageous, for example, in applications in the electronics industry.

In one embodiment of the present invention the isocyanates used have a total hydrolyzable chlorine content of less than 200 ppm, preferably of less than 120 ppm, more preferably less than 80 ppm, very preferably less than 50 ppm, in particular less than 15 ppm, and especially less than 10 ppm. This can be measured by means, for example, of ASTM specification D4663-98. Of course, though, monomeric isocyanates having a higher chlorine content can also be used, of up to 1000 ppm, for example, preferably up to 800 ppm and more preferably up to 500 ppm total chlorine content (determined by argentometric titration after hydrolysis) and at the same time up to 100 ppm, preferably up to 30 ppm, hydrolyzable chlorine content.

It will be appreciated that it is also possible to employ mixtures of those monomeric isocyanates which have been obtained by reacting the (cyclo)aliphatic diamines with, for example, urea and alcohols and cleaving the resulting (cyclo)aliphatic biscarbamic esters, with those diisocyanates which have been obtained by phosgenating the corresponding amines.

The polyisocyanates (A) which can be formed by oligomerizing the monomeric isocyanates are generally characterized as follows:

The average NCO functionality of such compounds is in general at least 1.8 and can be up to 8, preferably 2 to 5, and more preferably 2.4 to 4.

The isocyanate group content after oligomerization, calculated as NCO=42 g/mol, is generally from 5% to 25% by weight unless otherwise specified.

The polyisocyanates (A) are preferably compounds as follows:

1) Polyisocyanates containing isocyanurate groups and derived from aromatic, aliphatic and/or cycloaliphatic diisocyanates. Particular preference is given in this context to the corresponding aliphatic and/or cycloaliphatic isocyanatoisocyanurates and in particular to those based on hexamethylene diisocyanate and isophorone diisocyanate. The isocyanurates present are, in particular, trisisocyanatoalkyl and/or trisisocyanatocycloalkyl isocyanurates, which constitute cyclic trimers of the diisocyanates, or are mixtures with their higher homologs containing more than one isocyanurate ring. The isocyanatoisocyanurates generally have an NCO content of 10% to 30% by weight, in particular 15% to 25% by weight, and an average NCO functionality of 2.6 to 8.

The polyisocyanates containing isocyanurate groups may to a minor extent also comprise urethane groups and/or allophanate groups, preferably with a bound-alcohol content of less than 2%, based on the polyisocyanate.

2) Polyisocyanates containing uretdione groups and having aromatically, aliphatically and/or cycloaliphatically attached isocyanate groups, preferably aliphatically and/or cycloaliphatically attached, and in particular those derived from hexamethylene diisocyanate or isophorone diisocyanate. Uretdione diisocyanates are cyclic dimerization products of diisocyanates.

The polyisocyanates containing uretdione groups are obtained frequently in a mixture with other polyisocyanates, more particularly those specified under 1). Polyisocyanates containing uretdione groups typically have functionalities of 2 to 3.

For this purpose the diisocyanates can be reacted under reaction conditions under which not only uretdione groups but also the other polyisocyanates are formed, or the uretdione groups are formed first of all and are subsequently reacted to give the other polyisocyanates, or the diisocyanates are first reacted to give the other polyisocyanates, which are subsequently reacted to give products containing uretdione groups.

3) Polyisocyanates containing biuret groups and having aromatically, cycloaliphatically or aliphatically attached, preferably cycloaliphatically or aliphatically attached, isocyanate groups, especially tris(6-isocyanatohexyl)biuret or its mixtures with its higher homologs. These polyisocyanates containing biuret groups generally have an NCO content of 18% to 24% by weight and an average NCO functionality of 2.8 to 6.

4) Polyisocyanates containing urethane and/or allophanate groups and having aromatically, aliphatically or cycloaliphatically attached, preferably aliphatically or cycloaliphatically attached, isocyanate groups, as they, for example, by reacting excess amounts of diisocyanate, such as of hexamethylene diisocyanate or of isophorone diisocyanate, with mono- or polyhydric alcohols (A). These polyisocyanates containing urethane and/or allophanate groups generally have an NCO content of 12% to 24% by weight and an average NCO functionality of 2.0 to 4.5. Polyisocyanates of this kind containing urethane and/or allophanate groups may be prepared without catalyst or, preferably, in the presence of catalysts, such as ammonium carboxylates or ammonium hydroxides, for example, or allophanatization catalysts, such as bismuth, cobalt, cesium, Zn(II) or Zr(IV) compounds, for example, in each case in the presence of monohydric, dihydric or polyhydric, preferably monohydric, alcohols.

These polyisocyanates containing urethane groups and/or allophanate groups occur frequently in hybrid forms with the polyisocyanates specified under 1).

5) Polyisocyanates comprising oxadiazinetrione groups, derived preferably from hexamethylene diisocyanate or isophorone diisocyanate. Polyisocyanates of this kind comprising oxadiazinetrione groups are accessible from diisocyanate and carbon dioxide.
6) Polyisocyanates comprising iminooxadiazinedione groups, derived preferably from hexamethylene diisocyanate or isophorone diisocyanate. Polyisocyanates of this kind comprising iminooxadiazinedione groups are preparable from diisocyanates by means of specific catalysts.
7) Uretonimine-modified polyisocyanates.
8) Carbodiimide-modified polyisocyanates.
9) Hyperbranched polyisocyanates, of the kind known for example from DE-A1 10013186 or DE-A1 10013187.
10) Polyurethane-polyisocyanate prepolymers, from di- and/or polyisocyanates with alcohols.
11) Polyurea-polyisocyanate prepolymers.
12) The polyisocyanates 1)-11), preferably 1), 3), 4), and 6), can be converted, following their preparation, into polyisocyanates containing biuret groups or urethane/allophanate groups and having aromatically, cycloaliphatically or aliphatically attached, preferably (cyclo)aliphatically attached, isocyanate groups. The formation of biuret groups, for example, is accomplished by addition of water or by reaction with amines. The formation of urethane and/or allophanate groups is accomplished by reaction with monohydric, dihydric or polyhydric, preferably monohydric, alcohols, in the presence optionally of suitable catalysts. These polyisocyanates containing biuret or urethane/allophanate groups generally have an NCO content of 10% to 25% by weight and an average NCO functionality of 3 to 8.
13) Hydrophilically modified polyisocyanates, i.e., polyisocyanates which as well as the groups described under 1-12 also comprise groups which result formally from addition of molecules containing NCO-reactive groups and hydrophilizing groups to the isocyanate groups of the above molecules. The latter groups are nonionic groups such as alkylpolyethylene oxide and/or ionic groups derived from phosphoric acid, phosphonic acid, sulfuric acid or sulfonic acid, and/or their salts.
14) Modified polyisocyanates for dual cure applications, i.e., polyisocyanates which as well as the groups described under 1-13 also comprise groups resulting formally from addition of molecules containing NCO-reactive groups and UV-crosslinkable or actinic-radiation-crosslinkable groups to the isocyanate groups of the above molecules. These molecules are, for example, hydroxyalkyl(meth)acrylates and other hydroxy-vinyl compounds.

In one preferred embodiment of the present invention the polyisocyanate (A) is selected from the group consisting of isocyanurates, biurets, urethanes, and allophanates, preferably from the group consisting of isocyanurates, urethanes, and allophanates; more preferably it is a polyisocyanate containing isocyanurate groups.

In one particularly preferred embodiment the polyisocyanate (A) encompasses polyisocyanates comprising isocyanurate groups and obtained from 1,6-hexamethylene diisocyanate.

In one further particularly preferred embodiment the polyisocyanate (A) encompasses a mixture of polyisocyanates comprising isocyanurate groups, very preferably of 1,6-hexamethylene diisocyanate and of isophorone diisocyanate.

In one particularly preferred embodiment the polyisocyanate (A) is a mixture comprising low-viscosity polyisocyanates, preferably polyisocyanates comprising isocyanurate groups, having a viscosity of 600-1500 mPa*s, more particularly below 1200 mPa*s, low-viscosity urethanes and/or allophanates having a viscosity of 200-1600 mPa*s, more particularly 600-1500 mPa*s, and/or polyisocyanates comprising iminooxadiazinedione groups.

In this specification, unless noted otherwise, the viscosity is reported at 23° C. in accordance with DIN EN ISO 3219/A.3 in a cone/plate system with a shear rate of 1000 $s^{-1}$.

The process for preparing the polyisocyanates may take place as described in WO 2008/68198, especially from page 20 line 21 to page 27 line 15 therein, which is hereby made part of the present specification by reference.

The reaction can be discontinued, for example, as described therein from page 31 line 19 to page 31 line 31, and working up may take place as described therein from page 31 line 33 to page 32 line 40, which in each case is hereby made part of the present specification by reference.

The reaction can alternatively be discontinued as described in WO 2005/087828 from page 11 line 12 to page 12 line 5, which is hereby made part of the present specification by reference.

In the case of thermally labile catalysts it is also possible, furthermore, to discontinue the reaction by heating the reaction mixture to a temperature above at least 80° C., preferably at least 100° C., more preferably at least 120° C. Generally it is sufficient for this purpose to heat the reaction mixture, in the way which is necessary at the working-up stage in order to separate the unreacted isocyanate by distillation.

In the case both of thermally non-labile catalysts and of thermally labile catalysts, the possibility exists of terminating the reaction at relatively low temperatures by addition of deactivators. Examples of suitable deactivators are hydrogen chloride, phosphoric acid, organic phosphates, such as dibutyl phosphate or diethylhexyl phosphate, carbamates such as hydroxyalkyl carbamate, or organic carboxylic acids.

These compounds are added neat or diluted in a suitable concentration as necessary to discontinue the reaction.

The binder (B) is at least one compound, for example, one to three, preferably one to two, and more preferably precisely one compound, which contains at least two isocyanate-reactive groups, preferably 2 to 15, more preferably 2 to 8, and very preferably 3 to 7.

The isocyanate-reactive groups are hydroxyl, primary or secondary amino groups, more particularly hydroxyl groups, among these preferably primary or secondary hydroxyl groups, more preferably primary hydroxyl groups.

The binders may be, for example, polyacrylate polyols, polyester polyols, polyether polyols, polyurethane polyols; polyurea polyols; polyester-polyacrylate polyols; polyester-polyurethane polyols; polyurethane-polyacrylate polyols, polyurethane-modified alkyd resins; fatty acid-modified polyester-polyurethane polyols, copolymers with allyl ethers, graft polymers of the stated groups of compounds having, for example, different glass transition temperatures, and also mixtures of the stated binders. Preference is given to polyacrylate polyols, polyester polyols, and polyurethane polyols.

Preferred OH numbers, measured in accordance with DIN 53240-2 (potentiometrically), are 40-350 mg KOH/g resin solids for polyesters, preferably 80-180 mg KOH/g resin solids, and 15-250 mg KOH/g resin solids for polyacrylateols, preferably 80-160 mg KOH/g.

Additionally the binders may have an acid number in accordance with DIN EN ISO 3682 (potentiometrically) of up to 200 mg KOH/g, preferably up to 150 and more preferably up to 100 mg KOH/g.

Particularly preferred binders (B) are polyacrylate polyols and polyesterols.

Polyacrylate polyols preferably have a molecular weight $M_n$ of at least 500, more preferably at least 1200 g/mol. The molecular weight $M_n$ may in principle have no upper limit, and may preferably be up to 50 000 g/mol, more preferably up to 20 000 g/mol, and very preferably up to 10 000 g/mol, and more particularly up to 5000 g/mol.

The hydroxy-functional monomers (see below) are used in the copolymerization in amounts such as to result in the abovementioned hydroxyl numbers on the part of the polymers, corresponding in general to a hydroxyl group content on the part of the polymers of 0.5% to 8%, preferably 1% to 5% by weight.

The copolymers in question are hydroxyl-containing copolymers of at least one hydroxyl-containing (meth)acrylate with at least one further polymerizable comonomer selected from the group consisting of (meth)acrylic acid alkyl esters, vinyl aromatics, $\alpha,\beta$-unsaturated carboxylic acids, and other monomers.

Examples of suitable (meth)acrylic acid alkyl esters include $C_1$-$C_{20}$ alkyl(meth)acrylates, vinyl aromatics are those having up to 20 C atoms, $\alpha,\beta$-unsaturated carboxylic acids also comprise their anhydrides, and other monomers are, for example, vinyl esters of carboxylic acids comprising up to 20 C atoms, ethylenically unsaturated nitriles, vinyl ethers of alcohols comprising 1 to 10 C atoms, and, less preferably, aliphatic hydrocarbons having 2 to 8 C atoms and 1 or 2 double bonds.

Preferred (meth)acrylic acid alkyl esters are those having a $C_1$-$C_{10}$ alkyl radical, such as methyl methacrylate, methyl acrylate, n-butyl acrylate, ethyl acrylate, and 2-ethylhexyl acrylate.

Also suitable in particular are mixtures of the (meth)acrylic acid alkyl esters.

Vinyl esters of carboxylic acids having 1 to 20 C atoms are, for example, vinyl laurate, vinyl stearate, vinyl propionate, and vinyl acetate.

$\alpha,\beta$-Unsaturated carboxylic acids and their anhydrides may be, for example, acrylic acid, methacrylic acid, fumaric acid, crotonic acid, itaconic acid, maleic acid or maleic anhydride, preferably acrylic acid.

Hydroxy-functional monomers include monoesters of $\alpha,\beta$-unsaturated carboxylic acids, such as acrylic acid, methacrylic acid (identified for short in this specification as "(meth)acrylic acid"), with diols or polyols which have preferably 2 to 20 C atoms and at least two hydroxyl groups, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,4-butanediol, 1,5-pentanediol, neopentyl glycol, neopentyl glycol hydroxypivalate, 2-ethyl-1,3-propanediol, 2-methyl-1,3-propanediol, 2-butyl-2-ethyl-1,3-propanediol, 1,6-hexanediol, 2-methyl-1,5-pentanediol, 2-ethyl-1,4-butanediol, 2-ethyl-1,3-hexanediol, 2,4-diethyloctane-1,3-diol, 2,2-bis (4-hydroxycyclohexyl)propane, 1,1-, 1,2-, 1,3- and 1,4-bis (hydroxymethyl)cyclohexane, 1,2-, 1,3- or 1,4-cyclohexanediol, glycerol, trimethylolethane, trimethylolpropane, trimethylolbutane, pentaerythritol, ditrimethylolpropane, dipentaerythritol, sorbitol, mannitol, diglycerol, threitol, erythritol, adonitol (ribitol), arabitol (lyxitol), xylitol, dulcitol (galactitol), maltitol, isomalt, polyTHF with a molar weight between 162 and 4500, preferably 250 to 2000, poly-1,3-propanediol or polypropylene glycol with a molar weight between 134 and 2000, or polyethylene glycol with a molar weight between 238 and 2000.

Preference is given to 2-hydroxyethyl acrylate, 2-hydroxyethyl methacrylate, 2- or 3-hydroxypropyl acrylate, 1,4-butanediol monoacrylate or 3-(acryloyloxy)-2-hydroxypropyl acrylate, and particular preference to 2-hydroxyethyl acrylate and/or 2-hydroxyethyl methacrylate.

Examples of suitable vinyl aromatic compounds include vinyltoluene, $\alpha$-butylstyrene, $\alpha$-methylstyrene, 4-n-butylstyrene, 4-n-decylstyrene, and—preferably—styrene.

Examples of nitriles are acrylonitrile and methacrylonitrile.

Examples of suitable vinyl ethers are vinyl methyl ether, vinyl isobutyl ether, vinyl hexyl ether, and vinyl octyl ether.

Suitable nonaromatic hydrocarbons having 2 to 8 C atoms and one or two olefinic double bonds include butadiene, isoprene, and also ethylene, propylene, and isobutylene.

It is also possible to employ N-vinylformamide, N-vinylpyrrolidone, and N-vinylcaprolactam, and also ethylenically unsaturated acids, especially carboxylic acids, acid anhydrides or acid amides, and also vinylimidazole. Comonomers containing epoxide groups, such as, for example, glycidyl acrylate or methacrylate, or monomers such as N-methoxymethylacrylamide or N-methoxymethylmethacrylamide, can be used as well in minor amounts.

Preference is given to esters of acrylic acid and/or of methacrylic acid with 1 to 18, preferably 1 to 8, carbon atoms in the alcohol radical, such as, for example, methyl acrylate, ethyl acrylate, isopropyl acrylate, n-propyl acrylate, n-butyl acrylate, 2-ethylhexyl acrylate, and n-stearyl acrylate, the methacrylates corresponding to these acrylates, styrene, alkyl-substituted styrenes, acrylonitrile, methacrylonitrile, vinyl acetate or vinyl stearate, or any desired mixtures of such monomers.

The hydroxyl-bearing monomers are used in the copolymerization of the hydroxyl-bearing (meth)acrylates in a mixture with other polymerizable monomers, preferably free-radically polymerizable monomers, preferably those composed to an extent of more than 50% by weight of $C_1$-$C_{20}$, preferably $C_1$ to $C_4$ alkyl(meth)acrylate, (meth)acrylic acid, vinylaromatics having up to 20 C atoms, vinyl esters of carboxylic acids comprising up to 20 C atoms, vinyl halides, nonaromatic hydrocarbons having 4 to 8 C atoms and 1 or 2 double bonds, unsaturated nitriles, and mixtures thereof. Particular preference is given to the polymers composed—besides the hydroxyl-bearing monomers—to an extent of more than 60% by weight of $C_1$-$C_{10}$ alkyl (meth)acrylates, styrene and its derivatives, or mixtures thereof.

The polymers can be prepared by polymerization in accordance with customary techniques. The polymers are prepared preferably in an emulsion polymerization or in organic solution. Continuous or discontinuous polymerization techniques are possible. The discontinuous techniques include the batch technique and the feed technique, the latter being preferred. In the feed technique, the solvent is introduced, alone or together with part of the monomer mixture, and this initial charge is heated to the polymerization temperature; the polymerization, in the case of a monomer charge, is initiated free-radically, and the remaining monomer mixture, together with an initiator mixture, is metered in over the course of 1 to 10 hours, preferably 3 to 6 hours. Optionally there is subsequent reactivation, in order to carry through the polymerization to a conversion of at least 99%.

Examples of suitable solvents include aromatics, such as solvent naphtha, benzene, toluene, xylene, chlorobenzene, esters such as ethyl acetate, butyl acetate, methylglycol acetate, ethylglycol acetate, methoxypropyl acetate, ethers such as butylglycol, tetrahydrofuran, dioxane, ethylglycol ether, ketones such as acetone, methyl ethyl ketone, halogenated solvents such as methylene chloride or trichloromonofluoroethane.

Further binders (B) are, for example, polyester polyols, as are obtainable by condensing polycarboxylic acids, especially dicarboxylic acids, with polyols, especially diols. In order to ensure a polyester polyol functionality that is appropriate for the polymerization, use is also made in part of triols, tetrols, etc, and also triacids, etc.

Polyester polyols are known for example from Ullmanns Encyklopädie der technischen Chemie, 4th edition, volume 19, pp. 62 to 65. It is preferred to use polyester polyols which are obtained by reacting dihydric alcohols with dibasic carboxylic acids. In lieu of the free polycarboxylic acids it is also possible to use the corresponding polycarboxylic anhydrides or corresponding polycarboxylic esters of lower alcohols or mixtures thereof to prepare the polyester polyols. The polycarboxylic acids may be aliphatic, cycloaliphatic, aromatic or heterocyclic and may if appropriate be substituted, by halogen atoms for example, and/or unsaturated. Examples thereof that may be mentioned include the following:

Oxalic acid, maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid or tetrahydrophthalic acid, suberic acid, azelaic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, their isomers and hydrogenation products, and also esterifiable derivatives, such as anhydrides or dialkyl esters, $C_1$-$C_4$ alkyl esters for example, preferably methyl, ethyl or n-butyl esters, of the stated acids are employed. Preference is given to dicarboxylic acids of the general formula HOOC—$(CH_2)_y$—COOH, where y is a number from 1 to 20, preferably an even number from 2 to 20, and more preferably succinic acid, adipic acid, sebacic acid, and dodecanedicarboxylic acid.

Suitable polyhydric alcohols for preparing the polyesterols include 1,2-propanediol, ethylene glycol, 2,2-dimethyl-1,2-ethanediol, 1,3-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, Poly-THF having a molar mass of between 162 and 4500, preferably 250 to 2000, poly-1,3-propanediol having a molar mass between 134 and 1178, poly-1,2-propanediol having a molar mass between 134 and 898, polyethylene glycol having a molar mass between 106 and 458, neopentyl glycol, neopentyl glycol hydroxypivalate, 2-ethyl-1,3-propanediol, 2-methyl-1,3-propanediol, 2,2-bis(4-hydroxycyclohexyl)propane, 1,1-, 1,2-, 1,3- and 1,4-cyclohexanedimethanol, 1,2-, 1,3- or 1,4-cyclohexanediol, trimethylolbutane, trimethylolpropane, trimethylolethane, neopentyl glycol, pentaerythritol, glycerol, ditrimethyloipropane, dipentaerythritol, sorbitol, mannitol, diglycerol, threitol, erythritol, adonitol (ribitol), arabitol (lyxitol), xylitol, dulcitol (galactitol), maltitol or isomalt, which optionally may have been alkoxylated as described above.

Preferred alcohols are those of the general formula HO—$(CH_2)_x$—OH, where x is a number from 1 to 20, preferably an even number from 2 to 20. Preferred are ethylene glycol, butane-1,4-diol, hexane-1,6-diol, octane-1,8-diol and dodecane-1,12-diol. Additionally preferred is neopentyl glycol.

Also suitable, furthermore, are polycarbonate diols of the kind obtainable, for example, by reacting phosgene with an excess of the low molecular mass alcohols specified as synthesis components for the polyester polyols.

Also suitable are lactone-based polyester diols, which are homopolymers or copolymers of lactones, preferably hydroxy-terminated adducts of lactones with suitable difunctional starter molecules. Suitable lactones are preferably those which derive from compounds of the general formula HO—$(CH_2)_z$—COOH, where z is a number from 1 to 20 and where one H atom of a methylene unit may also have been substituted by a $C_1$ to $C_4$ alkyl radical. Examples are ε-caprolactone, β-propiolactone, gamma-butyrolactone and/or methyl-ε-caprolactone, 4-hydroxybenzoic acid, 6-hydroxy-2-naphthoic acid or pivalolactone, and mixtures thereof. Examples of suitable starter components include the low molecular mass dihydric alcohols specified above as a synthesis component for the polyester polyols. The corresponding polymers of ε-caprolactone are particularly preferred. Lower polyester diols or polyether diols as well can be used as starters for preparing the lactone polymers. In lieu of the polymers of lactones it is also possible to use the corresponding, chemically equivalent polycondensates of the hydroxycarboxylic acids corresponding to the lactones.

In polyurethane coating materials, molar masses $M_n$ of the polyesters of 800-4000 g/mol are typical, the polyesters used here not being limited to these.

Additionally suitable as binders are polyetherols, which are prepared by addition reaction of ethylene oxide, propylene oxide and/or butylene oxide, preferably ethylene oxide and/or propylene oxide, and more preferably ethylene oxide, with H-active components. Polycondensates of butanediol are also suitable. In polyurethane coating materials, molar masses of the polyethers of 500-2000 g/mol are typical, the polyethers used here not being limited to these.

The polymers may be replaced at least in part by what are known as reactive diluents. These may be blocked secondary or primary amines (aldimines and ketimes) or compounds having sterically hindered and/or electron-poor secondary amino groups, examples being aspartic esters in accordance with EP 403921 or WO 2007/39133.

(C) Imidazolium Salt

Compound (C) is at least one, for example, one to three, preferably one to two, and more preferably precisely one imidazolium salt of the formula I

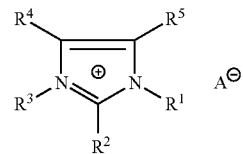

in which $R^1$ and $R^3$ independently of one another are an organic radical having 1 to 20 C atoms, $R^2$, $R^4$ and $R^5$ are independently of one another an H atom or an organic radical having up to 20 C atoms, and $A^-$ is an anion.

$R^1$ and $R^3$ are preferably independently of one another an organic radical having 1 to 10 C atoms. The organic radical may also comprise further heteroatoms, more particularly oxygen atoms, nitrogen, sulfur or phosphorus atoms, or functional groups, as for example hydroxyl groups, ether groups, ester groups, or carbonyl groups.

More particularly $R^1$ and $R^3$ are a hydrocarbon radical which apart from carbon and hydrogen may further comprise at most hydroxyl groups, ether groups, ester groups or carbonyl groups.

$R^1$ and $R^3$ with particular preference are independently of one another a hydrocarbon radical having 1 to 20 C atoms, more particularly having 1 to 10 C atoms, which comprises no other heteroatoms, e.g., oxygen or nitrogen. The hydrocarbon radical may be aliphatic (in which case unsaturated aliphatic groups are also included) or aromatic, or may comprise both aromatic and aliphatic groups. Preferably $R^1$ and $R^3$ are an aliphatic hydrocarbon radical.

Examples of hydrocarbon radicals include the phenyl group, benzyl group, a benzyl group or phenyl group substituted by one or more $C_1$ to $C_4$ alkyl groups, or the mesityl group, alkyl groups and alkenyl groups, more particularly the alkyl group.

With very particular preference $R^1$ and $R^3$ independently of one another are a $C_1$ to $C_{18}$ alkyl group, preferably a $C_1$ to $C_{16}$, more preferably a $C_1$ to $C_{14}$, very preferably $C_1$ to $C_{12}$, and more particularly $C_1$ to $C_{10}$ alkyl group. As an alkyl group, a $C_1$ to $C_6$ alkyl group represents one particular embodiment, and in a very particular embodiment the alkyl group is a $C_1$ to $C_4$ alkyl group.

With very particular preference $R^1$ and $R^3$ are independently of one another a methyl, ethyl, n-propyl, isopropyl, n-butyl, sec-butyl or tert-butyl group, with the methyl, ethyl n-propyl, and n-butyl groups having particular importance.

$R^1$ is preferably a $C_1$ to $C_8$, more particularly a $C_1$ to $C_4$ alkyl group.

$R^3$ is preferably a methyl group.

In one preferred embodiment $R^2$ is an H atom.

In another preferred embodiment $R^2$ is an alkyl group, as for example a $C_1$ to $C_{18}$ alkyl group, preferably a $C_1$ to $C_{16}$, more preferably a $C_1$ to $C_{14}$, very preferably $C_1$ to $C_{12}$, and more particularly $C_1$ to $C_{10}$ alkyl group. For the radical $R^2$, a $C_1$ to $C_6$ alkyl group represents one particular embodiment, and in a very particular embodiment the alkyl group is a $C_1$ to $C_4$ alkyl group.

$R^4$ and $R^5$ are preferably independently of one another a hydrogen atom or an organic radical having 1 to 10 C atoms. The organic radical may also comprise further heteroatoms, more particularly oxygen atoms, nitrogen, sulfur or phosphorus atoms, or functional groups, as for example hydroxyl groups, ether groups, ester groups, or carbonyl groups.

More particularly $R^4$ and $R^5$ are a hydrocarbon radical which apart from carbon and hydrogen may further comprise at most hydroxyl groups, ether groups, ester groups or carbonyl groups.

$R^4$ and $R^5$ with particular preference are independently of one another a hydrocarbon radical having 1 to 20 C atoms, more particularly having 1 to 10 C atoms, which comprises no other heteroatoms, e.g., oxygen or nitrogen. The hydrocarbon radical may be aliphatic (in which case unsaturated aliphatic groups are also included) or aromatic, or may comprise both aromatic and aliphatic groups. Preferably $R^1$ and $R^2$ are an aliphatic hydrocarbon radical.

Examples of hydrocarbon radicals include the phenyl group, benzyl group, a benzyl group or phenyl group substituted by one or more $C_1$ to $C_4$ alkyl groups, or the mesityl group, alkyl groups and alkenyl groups, more particularly the alkyl group.

With very particular preference $R^4$ and $R^5$ are a hydrogen atom or a $C_1$ to $C_{10}$ alkyl group. A particularly preferred alkyl group is a $C_1$ to $C_6$ alkyl group, and in one particular embodiment the alkyl group is a $C_1$ to $C_4$ alkyl group.

With very particular preference $R^4$ and $R^5$ are independently of one another a methyl, ethyl, n-propyl, isopropyl, n-butyl, sec-butyl or tert-butyl group, with the methyl, ethyl n-propyl, and n-butyl groups having particular importance.

In one particular embodiment $R^4$ and $R^5$ are each H atoms.

In another particular embodiment $R^2$, $R^4$, and $R^5$ are each H atoms.

Symmetrical 1,3-dialkyl-substituted and symmetrical 1,3-dialkyl-2-$R^2$-substituted imidazolium ions are a further preferred embodiment.

Examples of imidazolium ions are 1,2-dimethyl-3-propylimidazolium, 1-ethyl-2,3-dimethylimidazolium, 1-butyl-2,3-dimethylimidazolium, 1-benzyl-3-methylimidazolium, 3-ethyl-1-methylimidazolium, 1-propyl-3-methylimidazolium, 3-n-butyl-1-methylimidazolium, 1-hexyl-3-methylimidazolium, 1-methyl-3-octylimidazolium, 1-decyl-3-methylimidazolium, 1-dodecyl-3-methylimidazolium, 1,3-diethylimidazolium, 1,3-diisopropylimidazolium, 1,3-di-n-butylimidazolium, 1,3-dihexylimidazolium, and 1,2,3,4,5-pentamethylimidazolium.

Preferred imidazolium ions are 3-ethyl-1-methylimidazolium, 3-n-butyl-1-methylimidazolium, 1,3-diethylimidazolium; 1,3-dihexylimidazolium, 1,3-di-n-butylimidazolium, and 1,3-diisopropylimidazolium, and also 1,2,3,4,5-pentamethylimidazolium.

The anion $A^-$ in formula I is any desired anion, preferably a carboxylate anion.

Anions other than carboxylate anion are described, for example, in WO 2007/090755, particularly from page 20 line 36 to page 24 line 37 therein, which is hereby made part of the present disclosure content by reference.

Suitable anions are more particularly those from the group of the halides and halogen-containing compounds of the following formulae:

$F^-$, $Cl^-$, $Br^-$, $I^-$, $BF_4^-$, $PF_6^-$, $AlCl_4^-$, $Al_2Cl_7^-$, $Al_3Cl_{10}^-$, $AlBr_4^-$, $FeCl_4^-$, $BCl_4^-$, $SbF_6^-$, $AsF_6^-$, $ZnCl_3^-$, $SnCl_3^-$, $CuCl_2^-$, $CF_3SO_3^-$, $(CF_3SO_3)_2N^-$, $CF_3CO_2^-$, $CCl_3CO_2^-$, $CN^-$, $SCN^-$, $OCN^-$, $NO^{2-}$, $NO^{3-}$, $N(CN)^-$;

the group of the sulfates, sulfites, and sulfonates, of the following general formulae:

$SO_4^{2-}$, $HSO_4^-$, $SO_3^{2-}$, $HSO_3^-$, $R^aOSO_3^-$, $R^aSO_3^-$;

the group of the phosphates, of the following general formulae:

$PO_4^{3-}$, $HPO_4^{2-}$, $H_2PO_4^-$, $R^aPO_4^{2-}$, $R^aPO_4^-$, $R^aR^bPO_4^-$;

the group of the phosphonates and phosphinates, of the following general formula:

$R^aHPO_3^-$, $R^aR^bPO_2^-$, $R^aR^bPO_3^-$;

the group of the phosphites, of the following general formulae:

$PO_3^{3-}$, $HPO_3^{2-}$, $H_2PO_3^-$, $R^aPO_3^{2-}$, $R^aHPO_3^-$, $R^aR^bPO_3^-$;

the group of the phosphonites and phosphinites, of the following general formula:

$R^aR^bPO_2^-$, $R^aHPO_2^-$, $R^aR^bPO^-$, $R^aHPO^-$;

the group of the borates, of the following general formulae:

$BO_3^{3-}$, $HBO_3^{2-}$, $H_2BO_3^-$, $R^aR^bBO_3^-$, $R^aHBO_3^-$, $R^aBO_3^{2-}$, $B(OR^a)(OR^b)(OR^c)(OR^d)^-$, $B(HSO_4)^-$, $B(R^aSO4)^-$;

the group of the boronates, of the following general formulae: $R^aBO_2^{2-}$, $R^aR^bBO^-$;

the group of the carbonates and carbonic esters, of the following general formulae:

$HCO_3^-$, $CO_3^{2-}$, $R^aCO_3^-$;

the group of the silicates and silicic acid esters, of the following general formulae:

$SiO_4^{4-}$, $HSiO_4^{3-}$, $H_2SiO_4^{2-}$, $H_3SiO_4^-$, $R^aSiO_4^{3-}$, $R^aR^bSiO_4^{2-}$, $R^aR^bR^cSiO_4^-$, $HR^aSiO_4^{2-}$, $H_2R^aSiO_4^-$, $HR^aR^bSiO_4^-$;

the group of the alkyl silane and aryl silane salts, of the following general formulae:
$R^aSiO_3^{3-}$, $R^aR^bSiO_2^{2-}$, $R^aR^bR^cSiO^-$, $R^aR^bR^cSiO_3^-$, $R^aR^bR^cSiO_2^-$, $R^aR^bSiO_3^{2-}$;
the group of the carboximides, bis(sulfonyl)imides, and sulfonylimides, of the following general formulae:

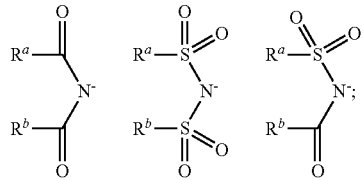

the group of the methides, of the following general formula:

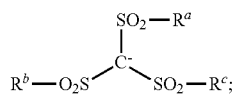

the group of the alkoxides and aryl oxides, of the following general formulae:
$R^aO^-$;
the group of the halometallates, of the following general formula:
$[M_rHal_t]^{s-}$,
where M is a metal and Hal is fluorine, chlorine, bromine or iodine, r and t are positive integers, and indicate the stoichiometry of the complex, and s is a positive integer and indicates the charge of the complex;
the group of the sulfides, hydrogen sulfides, polysulfides, hydrogenpolysulfides, and thiolates, of the following general formulae:
$S^{2-}$, $HS^-$, $[S_v]^-$, $[HS_v]^-$, $[R^aS]^-$,
where v is a positive integer from 2 to 10; and
the group of the complex metal ions such as $Fe(CN)_6^{3-}$, $Fe(CN)_6^{4-}$, $MnO_4^-$, $Fe(CO)_4^-$.

In the above anions, $R^a$, $R^b$, $R^b$, and $R^d$ independently of one another are in each case hydrogen;
$C_1$-$C_{30}$ alkyl and its aryl-, heteroaryl-, cycloalkyl-, halogen-, hydroxyl-, amino-, carboxyl-, formyl-, —O—, —CO—, —CO—O— or —CO—N< substituted components, such as, for example, methyl, ethyl, 1-propyl, 2-propyl, 1-butyl, 2-butyl, 2-methyl-1-propyl(isobutyl), 2-methyl-2-propyl(tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, triacontyl, phenylmethyl(benzyl), diphenylmethyl, triphenylmethyl, 2-phenylethyl, 3-phenylpropyl, cyclopentylmethyl, 2-cyclopentylethyl, 3-cyclopentylpropyl, cyclohexylmethyl, 2-cyclohexylethyl, 3-cyclohexylpropyl, methoxy, ethoxy, formyl, acetyl or $C_qF_{2(q-a)+(1-b)}H_{2a+b}$ with $q\le30$, $0\le a\le q$ and $b=0$ or 1 (for example, $CF_3$, $C_2F_5$, $CH_2CH_2$—$C_{(q-2)}F_{2(q-2)+1}$, $C_6F_{13}$, $C_8F_{17}$, $C_{10}F_{21}$, $C_{12}F_{25}$);

$C_3$-$C_{12}$ cycloalkyl and its aryl-, heteroaryl-, cycloalkyl-, halogen-, hydroxyl-, amino-, carboxyl-, formyl-, —O—, —CO— or —CO—O-substituted components, such as, for example, cyclopentyl, 2-methyl-1-cyclopentyl, 3-methyl-1-cyclopentyl, cyclohexyl, 2-methyl-1-cyclohexyl, 3-methyl-1-cyclohexyl, 4-methyl-1-cyclohexyl or $C_qF_{2(q-a)-(1-b)}H_{2a-b}$ with $q\le30$, $0\le a\le q$ and $b=0$ or 1;

$C_2$-$C_{30}$ alkenyl and its aryl-, heteroaryl-, cycloalkyl-, halogen-, hydroxyl-, amino-, carboxyl-, formyl-, —O—, —CO— or —CO—O-substituted components, such as, for example, 2-propenyl, 3-butenyl, cis-2-butenyl, trans-2-butenyl or $C_qF_{2(q-a)-(1-b)}H_{2a-b}$ with $q\le30$, $0\le a\le q$ and $b=0$ or 1;

$C_3$-$C_{12}$ cycloalkenyl and its aryl-, heteroaryl-, cycloalkyl-, halogen-, hydroxyl-, amino-, carboxyl-, formyl-, —O—, —CO— or —CO—O-substituted components, such as, for example 3-cyclopentenyl, 2-cyclohexenyl, 3-cyclohexenyl, 2,5-cyclohexadienyl or $C_qF_{2(q-a)-3(1-b)}H_{2a-3b}$ with $q\le30$, $0\le a\le q$ and $b=0$ or 1;

aryl or heteroaryl having 2 to 30 carbon atoms, and their alkyl-, aryl-, heteroaryl-, cycloalkyl-, halogen-, hydroxy-, amino-, carboxy-, formyl-, —O—, —CO— or —CO—O-substituted components, such as, for example, phenyl, 2-methylphenyl (2-tolyl), 3-methylphenyl (3-tolyl), 4-methylphenyl, 2-ethylphenyl, 3-ethylphenyl, 4-ethylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 4-phenylphenyl, 1-naphthyl, 2-naphthyl, 1-pyrrolyl, 2-pyrrolyl, 3-pyrrolyl, 2-pyridinyl, 3-pyridinyl, 4-pyridinyl or $C_6F_{(5-a)}H_a$ with $0\le a\le 5$; or two radicals denote an unsaturated, saturated or aromatic ring which is unsubstituted or substituted by functional groups, aryl, alkyl, aryloxy, alkyloxy, halogen, heteroatoms and/or heterocycles, and which is uninterrupted or interrupted by one or more oxygen and/or sulfur atoms and/or by one or more substituted or unsubstituted imino groups.

In the above anions, $R^a$, $R^b$, $R^c$, and $R^d$ are preferably each independently of one another a hydrogen atom or a $C_1$ to $C_{12}$ alkyl group.

Examples of anions include chloride; bromide; iodide; thiocyanate; hexafluorophosphate; trifluoromethanesulfonate; methanesulfonate; the carboxylates, especially formate; acetate; mandelate; nitrate; nitrite; trifluoroacetate; sulfate; hydrogensulfate; methylsulfate; ethylsulfate; 1-propylsulfate; 1-butylsulfate; 1-hexyl-sulfate; 1-octylsulfate; phosphate; dihydrogenphosphate; hydrogenphosphate; $C_1$-$C_4$ dialkylphosphates; propionate; tetrachloroaluminate; $Al_2Cl_7^-$; chlorozincate; chloroferrate; bis(trifluoromethylsulfonyl)imide; bis(pentafluoroethylsulfonyl)imide; bis(methylsulfonyl)imide; bis(p-tolylsulfonyl)imide; tris(trifluoromethylsulfonyl)methide; bis(pentafluoroethylsulfonyl)methide; p-tolylsulfonate; tetracarbonylcobaltate; dimethylene glycol monomethyl ether sulfate; oleate; stearate; acrylate; methacrylate; maleate; hydrogencitrate; vinylphosphonate; bis(pentafluoroethyl)phosphinate; borates such as bis[salicylato(2-)]borate, bis[oxalato(2-)]borate, bis[1,2-benzenediolato(2-)-O,O']borate, tetracyanoborate, tetrafluoroborate; dicyanamide; tris(pentafluoroethyl)trifluorophosphate; tris(heptafluoropropyl)trifluorophosphate, cyclic arylphosphates such as pyrrocatechol-phosphate $(C_6H_4O_2)P(O)O$—, and chlorocobaltate.

Particularly preferred anions are those from the group of the alkylsulfates
$R^aOSO_3^-$,
where $R^a$ is a $C_1$ to $C_{12}$ alkyl group, preferably a $C_1$-$C_6$ alkyl group,
of the alkylsulfonate $R^aSO_3^-$;
where $R^a$ is a $C_1$ to $C_{12}$ alkyl group, preferably a $C_1$-$C_6$ alkyl group,
of the halides, especially chloride and bromide, and
of the pseudohalides, such as thiocyanate, dicyanamide.

In one preferred embodiment the corresponding acids of the counterion of the imidazolium salts have a pKa of less than 24 in DMSO at 25° C.

Preferred in accordance with the invention are carboxylate anions, which may be anions of aliphatic or aromatic, preferably aliphatic, carboxylic acids.

Examples of anions of aromatic carboxylic acids are benzoate, salicylate, and nicotinate.

The alkanoate anions, in other words anions of an alkanecarboxylic acid, may be straight-chain or branched, preferably straight-chain.

The parent alkanecarboxylic acid has 1 to 20 carbon atoms, preferably 2 to 18, and more preferably 2 to 12.

Examples of such alkanoate anions are acetate, propionate, isopropanoate, 2,2-dimethylpropionate (pivalate), n-butanoate, isobutanoate, sec-butanoate, tert-butanoate, n-pentanoate, n-hexanoate, n-heptanoate, n-octanoate, isooctanoate, n-nonanoate, isononanoate, n-decanoate, n-dodecanoate, tetradecanoate, hexadecanoate, stearate, and n-eicosanoate, preference being given to acetate, propionate, isopropanoate, isobutanoate, tert-butanoate, and n-hexanoate, particular preference to acetate, propionate, isopropanoate, and isobutanoate, and very particular preference to acetate.

The synthesis of this kind of imidazolium ions with carboxylate anions as counterion is described in WO 2009/040242, for example. The synthesis of the symmetrical imidazolium salts is described in WO 2009/074535 A2, for example.

Working up may take place for example as described in WO 2009/027250 A2.

Examples of imidazolium catalysts include those in which $R^2=R^4=R^5=H$ and $R^1$ is an n-alkyl radical of chain length a, and $R^3$ is an n-alkyl radical of chain length c, and the anion is a carboxylate with an n-alkyl radical having a total of f carbon atoms. In this context, explicit mention may be made of those catalysts which are described by a-c-f=1-1-2; 1-3-2; 1-8-2; 1-10-2; 2-1-2; 2-2-8; 2-1-12; 2-2-2; 4-1-2; 4-4-2; 6-1-2; 6-1-12; 6-1-18; 8-1-2; 10-1-14; 10-1-16; 12-1-2; 12-1-12; 16-1-2; 16-1-8; 16-1-10; 18-1-8; 18-1-12; 18-1-14; 18-1-18.

Furthermore, mention may be made of corresponding compounds having an $R^2$ as an n-alkyl radical of chain length b, of the formula a-b-c-f=1-1-1-2; 2-1-1-2; 2-2-2-2; 4-1-1-2.

The following may also be mentioned: 1-methyl-3-vinylimidazolium alkoxylate, more particularly 1-methyl-3-vinylimidazolium acetate; 1-benzyl-3-methylimidazolium alkoxylate, more particularly 1-benzyl-3-methylimidazolium acetate, 1,3-diisopropylimidazolium carboxylate, more particularly 1,3-diisopropylimidazolium acetate, and 1,2,3,4,5-pentamethylimidazolium carboxylate, more particularly 1,2,3,4,5-pentamethylimidazolium acetate.

It is an advantage of the compounds (C) if at 1 bar they have a melting point of not more than 60° C., preferably not more than 40° C., and more preferably not more than 20° C.

In coating-material applications with aliphatic polyisocyanates, there is frequently a preference for components having a low intrinsic color (e.g., clearcoat). It is therefore an advantage of the compounds (C) if their intrinsic color, optionally following purification steps, is as low as possible. In one preferred form, this corresponds to iodine color numbers (DIN 6162) of less than 20, more preferably less than 15, very preferably less than 10, in particular less than 5, and especially less than 1.

Furthermore, optionally, there may be a solvent or solvent mixture (D) present. Solvents which can be used are preferably those in which the imidazolium salts are soluble at 25° C. to an extent of more than 1% by weight, preferably to an extent of more than 10% by weight.

Examples of those used include ketones, esters, alkoxylated alkanoic acid alkyl esters, ethers, or mixtures of the solvents.

Esters are, for example, n-butyl acetate, ethyl acetate, 1-methoxyprop-2-yl acetate, and 2-methoxyethyl acetate.

Ethers are, for example, THF, dioxane, and also the dimethyl, diethyl or di-n-butyl ethers of ethylene glycol, diethylene glycol, triethylene glycol, propylene glycol, dipropylene glycol or tripropylene glycol.

Ketones are, for example, acetone, diethyl ketone, ethylmethyl ketone, isobutyl methyl ketone, methyl amyl ketone, and tert-butyl methyl ketone.

Preferred solvents are n-butyl acetate, ethyl acetate, 1-methoxy prop-2-yl acetate, 2-methoxyethyl acetate, and mixtures thereof.

In the case of less soluble imidazolium salts which are solid at room temperature, ketones such as acetone and ethylmethyl ketone are particularly suitable solvents.

Further possible solvents are butylglycol diacetate (Merck Schuchardt OHG), butylglycol acetate (Merck Schuchardt OHG), dipropylene glycol dimethyl ether (Proglyde® DMM, Sigma-Aldrich, Germany), and propylene carbonate.

Alcohols can also be used as solvents, but ought to be kept low in their amount, particularly if they are monofunctional alcohols.

In one preferred variant the imidazolium salts are dissolved directly, without use of solvents, in one of the components (polyol or isocyanate-containing component).

Solvents which can be used are those which contain no groups that are reactive toward isocyanate groups or blocked isocyanate groups, and in which the polyisocyanates are soluble to an extent of at least 10%, preferably at least 25%, more preferably at least 50%, very preferably at least 75%, more particularly at least 90%, and especially at least 95% by weight.

Examples of solvents of this kind are aromatic hydrocarbons (including alkylated benzenes and naphthalenes) and/or (cyclo)aliphatic hydrocarbons and mixtures thereof, chlorinated hydrocarbons, ketones, esters, alkoxylated alkyl alkanoates, ethers, and mixtures of the solvents.

Preferred aromatic hydrocarbon mixtures are those which comprise predominantly aromatic $C_7$ to $C_{14}$ hydrocarbons and may encompass a boiling range from 110 to 300° C.; particular preference is given to toluene, o-, m- or p-xylene, trimethylbenzene isomeres, tetramethylbenzene isomers, ethylbenzene, cumene, tetrahydronaphthalene, and mixtures comprising them.

Examples thereof are the Solvesso® products from ExxonMobil Chemical, especially Solvesso® 100 (CAS No. 64742-95-6, predominantly $C_9$ and $C_{10}$ aromatics, boiling range about 154-178° C.), 150 (boiling range about 182-207° C.), and 200 (CAS No. 64742-94-5), and also the Shellsol® products from Shell, Caromax® (e.g., Caromax® 18) from Petrochem Carless and Hydrosol from DHC (e.g., as Hydrosol® A 170). Hydrocarbon mixtures comprising paraffins, cycloparaffins, and aromatics are also available commercially under the names Kristalloel (for example, Kristalloel 30, boiling range about 158-198° C. or Kristalloel 60: CAS No. 64742-82-1), white spirit (for example likewise CAS No.

64742-82-1) or solvent naphtha (light: boiling range about 155-180° C., heavy: boiling range about 225-300° C.). The aromatics content of such hydrocarbon mixtures is generally more than 90%, preferably more than 95%, more preferably more than 98%, and very preferably more than 99% by weight. It may be advisable to use hydrocarbon mixtures having a particularly reduced naphthalene content.

Examples of (cyclo)aliphatic hydrocarbons include decalin, alkylated decalin, and isomer mixtures of linear or branched alkanes and/or cycloalkanes.

The amount of aliphatic hydrocarbons is generally less than 5%, preferably less than 2.5%, and more preferably less than 1% by weight.

Esters are, for example, n-butyl acetate, ethyl acetate, 1-methoxyprop-2-yl acetate, and 2-methoxyethyl acetate.

Ethers are, for example, THF, dioxane, and also the dimethyl, diethyl or di-n-butyl ethers of ethylene glycol, diethylene glycol, triethylene glycol, propylene glycol, dipropylene glycol or tripropylene glycol.

Ketones are, for example, acetone, diethyl ketone, ethyl methyl ketone, isobutyl methyl ketone, methyl amyl ketone, and tert-butyl methyl ketone.

Preferred solvents are n-butyl acetate, ethyl acetate, 1-methoxyprop-2-yl acetate, 2-methoxyethyl acetate, and mixtures thereof, especially with the aromatic hydrocarbon mixtures recited above.

Mixtures of this kind may be produced in a volume ratio of 5:1 to 1:5, preferably in a volume ratio of 4:1 to 1:4, more preferably in a volume ratio of 3:1 to 1:3, and very preferably in a volume ratio of 2:1 to 1:2.

Preferred examples are butyl acetate/xylene, 1:1 methoxypropyl acetate/xylene, 1:1 butyl acetate/solvent naphtha 100, 1:2 butyl acetate/Solvesso® 100, and 3:1 Kristalloel 30/Shellsol® A.

Also preferred are aromatic hydrocarbon mixtures, such as Solvesso® 100, for example.

Furthermore it is possible optionally, although less preferably, for there to be at least one further urethanization catalyst (E) present. This may be, for example, an amine (E1) or an organometallic compound (E2).

Amines (E1) are, for example, tertiary aliphatic, cycloaliphatic or aromatic amines. Examples thereof are triethylamine, tri-n-butylamine, N-methylmorpholine, N-methylpiperidine, pyrrolidine, quinuclidine or 1,4-diazabicyclo[2.2.2]octane.

Organometallic compound (E2) are for example, such as for example tin(II) salts of organic carboxylic acids, e.g., tin(II) diacetate, tin(II) dioctoate, tin(II) bis(ethylhexanoate), and tin(II) dilaurate. It is additionally possible to use zinc(II) salts, such as zinc(II) dioctoate, for example. Also possible are metal complexes such as acetylacetonates of iron, of titanium, of aluminum, of zirconium, of manganese, of nickel, of zinc, and of cobalt. Further metal catalysts are described by Blank et al. in Progress in Organic Coatings, 1999, Vol. 35, pages 19-29.

Dialkyltin(IV) salts of organic carboxylic acids, e.g. dimethyltin diacetate, dibutyltin diacetate, dibutyltin dibutyrate, dibutyltin bis(2-ethylhexanoate), dibutyltin dilaurate, dibutyltin maleate, dioctyltin dilaurate, and dioctyltin diacetate, are less preferred, in the context of their substitution on toxicological grounds.

Preferred Lewis-acidic organometallic compounds are zinc(II) dioctoate, zirconium acetylacetonate, and zirconium 2,2,6,6-tetramethyl-3,5-heptanedionate.

Bismuth and cobalt catalysts, and also cesium salts, can also be used as catalysts. Cesium salts contemplated are those compounds in which the following anions are employed: $F^-$, $Cl^-$, $ClO^-$, $ClO_3^-$, $ClO_4^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$, and $(C_{n+1}H_{2n-2}O_4)^{2-}$, where n stands for the numbers 1 to 20.

Preference here is given to cesium carboxylates, in which the anion conforms to the formulae $(C_nH_{2n-1}O_2)^-$ and $(C_{n+1}H_{2n-2}O_4)^{2-}$ with n as 1 to 20. Particularly preferred cesium salts have as their anions monocarboxylates of the general formula $(C_nH_{2n-1}O_2)^-$, where n stands for the numbers 1 to 20. Deserving of particular mention in this context are formate, acetate, propionate, hexanoate, and 2-ethylhexanoate.

Further, typical coatings components and/or additives (F) used may be the following, for example: stabilizers, UV stabilizers such as UV absorbers and suitable free-radical scavengers (especially HALS compounds, hindered amine light stabilizers), activators (accelerators), drying agents, fillers, pigments, dyes, antistatic agents, flame retardants, thickeners, thixotropic agents, surface-active agents, viscosity modifiers, plasticizers or chelating agents. UV stabilizers are preferred.

Stabilizers are at least one compound having a stabilizing action, the term "stabilizing" identifying the capacity to reduce the development of a color number and/or of the viscosity of component A in the course of storage over a certain period of time as compared with those corresponding mixtures which comprise no compounds having a stabilizing action.

The stabilization may result either to component (A) alone, or to premixes of components (A) and (C), optionally with addition of further components. In one particular embodiment, this relates to the storage of one of these components prior to the actual application of the coating material.

These compounds having a stabilizing action are preferably selected from the group consisting of primary antioxidants (free-radical scavengers), secondary antioxidants (compounds which prevent free radicals forming, particularly by scavenging and/or decomposing peroxides), and acidic stabilizers (Bronsted acids).

The primary antioxidants are preferably sterically hindered phenols. Such sterically hindered phenols are described, for example, in WO 2008/116894, preferably the compounds described therein at page 14 line 10 to page 16 line 10, which is hereby made part of the present disclosure content by reference.

The secondary antioxidants are preferably selected from the group consisting of phosphites, phosphonites, phosphonates, secondary aromatic amines and thioethers, preferably from phosphonites or phosphonates.

The phosphites may be aromatic, aliphatic, cycloaliphatic or mixed aliphatic/aromatic phosphites; preferred phosphites are described in WO 2005/89085, particularly from page 6 line 1 to page 7 line 22 therein, this being hereby made part of the present disclosure content by reference.

Preferred phosphonites are described in WO 2008/116894, particularly from page 11 line 8 to page 14 line 8 therein, which is hereby made part of the present disclosure content by reference.

Preferred phosphonates are described in WO 2008/116895, particularly from page 10 line 38 to page 12 line 41 therein, which is hereby made part of the present disclosure content by reference.

Preferred secondary aromatic amines are diarylamines such as diphenylamine and phenylnaphthylamine or alkyldiarylamines such as alkyldiphenylamines and alkylphenylnaphthylamines, the alkyl group being, for example, a $C_1$ to $C_{18}$ alkyl group, preferably a $C_1$ to $C_{16}$, more preferably a $C_1$ to $C_{14}$, very preferably $C_1$ to $C_{12}$, and more particularly $C_1$ to $C_{10}$ alkyl group. One particular embodiment is a $C_1$ to $C_6$ alkyl group, and in one very particular embodiment the alkyl group is a $C_1$ to $C_4$ alkyl group.

Preferred thioethers are described in WO 2008/116893, particularly from page 11 line 1 to page 15 line 37 therein, which is hereby made part of the present disclosure content by reference.

The acidic stabilizers are Bronsted acids, as described in WO 2008/116894, particularly from page 17 line 34 to page 18 line 23 therein, which is hereby made part of the present disclosure content by reference.

Drying agents or dewatering agents are compounds which are able to react preferentially with water. Examples of suitable drying agents are para-toluenesulfonyl isocyanate (e.g., additive TI from Borchers), orthoester (e.g., additive OF from Borchers) or oxazolidines, examples being the Incozol products from ICL (Industrial Copolymers), or Basonat SCI from BASF. Toluenesulfonyl isocyanate is preferred. The presence of drying agent may be of advantage in particular in a polyisocyanate component or in a component comprising imidazolium catalysts.

Suitable UV absorbers comprise oxanilides, triazines and benzotriazole (the latter available, for example, as Tinuvin® products from Ciba Spezialitätenchemie) and benzophenones (e.g., Chimassorb® 81 from Ciba Spezialitätenchemie). Preference is given, for example, to 95% benzenepropanoic acid, 3-(2H-benzotriazol-2-yl)-5-(1,1-dimethylethyl)-4-hydroxy-, C7-9 branched and linear alkyl esters; 5% 1-methoxy-2-propyl acetate (e.g., Tinuvin® 384) and α-[3-[3-(2H-benzotriazol-2-yl)-5-(1,1-dimethylethyl)-4-hydroxyphenyl]-1-oxopropyl]-ω-hydroxypoly(oxo-1,2-ethanediyl) (e.g., Tinuvin® 1130), in each case products, for example, of Ciba Spezialitätenchemie. DL-alpha-tocopherol, tocopherol, cinnamic acid derivatives, and cyanoacrylates can likewise be used for this purpose.

These can be employed alone or together with suitable free-radical scavengers, examples being sterically hindered amines (often also identified as HALS or HAS compounds; hindered amine (light) stabilizers) such as 2,2,6,6-tetramethylpiperidine, 2,6-di-tert-butylpiperidine or derivatives thereof, e.g., bis(2,2,6,6-tetramethyl-4-piperidyl) sebacate. They are obtainable, for example, as Tinuvin® products and Chimassorb® products from Ciba Spezialitätenchemie. Preference in joint use with Lewis acids, however, is given to those hindered amines which are N-alkylated, examples being bis(1,2,2,6,6-pentamethyl-4-piperidinyl) [[3,5-bis(1,1-dimethylethyl)-4-hydroxyphenyl]methyl]butylmalonate (e.g., Tinuvin® 144 from Ciba Spezialitätenchemie); a mixture of bis(1,2,2,6,6-pentamethyl-4-piperidinyl)sebacate and methyl(1,2,2,6,6-pentamethyl-4-piperidinyl) sebacate (e.g., Tinuvin® 292 from Ciba Spezialitätenchemie); or which are N—(O-alkylated), such as, for example, decanedioic acid, bis(2,2,6,6-tetramethyl-1-(octyloxy)-4-piperidinyl)ester, reaction products with 1,1-dimethylethyl hydroperoxide and octane (e.g., Tinuvin® 123 from Ciba Spezialitätenchemie).

UV stabilizers are used typically in amounts of 0.1% to 5.0% by weight, based on the solid components present in the preparation.

Suitable thickeners include, in addition to free-radically (co)polymerized (co)polymers, typical organic and inorganic thickeners such as hydroxymethylcellulose or bentonite.

Chelating agents which can be used include, for example, ethylenediamineacetic acid and salts thereof and also β-diketones.

Pigments in the true sense are, according to CD Römpp Chemie Lexikon—Version 1.0, Stuttgart/New York: Georg Thieme Verlag 1995, with reference to DIN 55943, particulate "colorants that are organic or inorganic, chromatic or achromatic and are virtually insoluble in the application medium".

Virtually insoluble here means a solubility at 25° C. below 1 g/1000 g application medium, preferably below 0.5, more preferably below 0.25, very particularly preferably below 0.1, and in particular below 0.05 g/1000 g application medium.

Examples of pigments in the true sense comprise any desired systems of absorption pigments and/or effect pigments, preferably absorption pigments. There are no restrictions whatsoever on the number and selection of the pigment components. They may be adapted as desired to the particular requirements, such as the desired perceived color, for example, as described in step a), for example. It is possible for example for the basis to be all the pigment components of a standardized mixer coating system.

Effect pigments are all pigments which exhibit a platelet-shaped construction and give a surface coating specific decorative color effects. The effect pigments are, for example, all of the pigments which impart effect and can be used typically in vehicle finishing and industrial coatings. Examples of such effect pigments are pure metallic pigments, such as aluminum, iron or copper pigments; interference pigments, such as titanium dioxide-coated mica, iron oxide-coated mica, mixed oxide-coated mica (e.g., with titanium dioxide and $Fe_2O_3$ or titanium dioxide and $Cr_2O_3$), metal oxide-coated aluminum; or liquid-crystal pigments, for example.

The coloring absorption pigments are, for example, typical organic or inorganic absorption pigments that can be used in the coatings industry. Examples of organic absorption pigments are azo pigments, phthalocyanine pigments, quinacridone pigments, and pyrrolopyrrole pigments. Examples of inorganic absorption pigments are iron oxide pigments, titanium dioxide, and carbon black.

Dyes are likewise colorants, and differ from the pigments in their solubility in the application medium; i.e., they have a solubility at 25° C. of more than 1 g/1000 g in the application medium.

Examples of dyes are azo, azine, anthraquinone, acridine, cyanine, oxazine, polymethine, thiazine, and triarylmethane dyes. These dyes may find application as basic or cationic dyes, mordant dyes, direct dyes, disperse dyes, development dyes, vat dyes, metal complex dyes, reactive dyes, acid dyes, sulfur dyes, coupling dyes or substantive dyes.

Coloristically inert fillers are all substances/compounds which on the one hand are coloristically inactive, i.e., exhibit a low intrinsic absorption and have a refractive index similar to that of the coating medium, and which on the other hand are capable of influencing the orientation (parallel alignment) of the effect pigments in the surface coating, i.e., in the applied coating film, and also properties of the coating or of the coating compositions, such as hardness or rheology, for example. Inert substances/compounds which can be used are given by way of example below, but without restricting the concept of coloristically inert, topology-influencing fillers to these examples. Suitable inert fillers meeting the definition may be, for example, transparent or semitransparent fillers or pigments, such as silica gels, blanc fixe, kieselguhr, talc, calcium carbonates, kaolin, barium sulfate, magnesium silicate, aluminum silicate, crystalline silicon dioxide, amorphous silica, aluminum oxide, microspheres or hollow microspheres made, for example, of glass, ceramic or polymers, with sizes of 0.1-50 µm, for example. Additionally as inert fillers it is possible to employ any desired solid inert organic particles, such as urea-formaldehyde condensates, micronized polyolefin wax and micronized amide wax, for example. The inert fillers can in each case also be used in a mixture. It is preferred, however, to use only one filler in each case.

Preferred fillers comprise silicates, examples being silicates obtainable by hydrolysis of silicon tetrachloride, such as Aerosil® from Degussa, siliceous earth, talc, aluminum silicates, magnesium silicates, calcium carbonates, etc.

The constitution of the polyisocyanate compositions of the invention is, for example, as follows:
(A) 5% to 60%, preferably 10% to 50%, more preferably 10-30% by weight,
(B) 10% to 80%, preferably 20% to 60% by weight,
(C) 10 to 20 000 ppm by weight, preferably 50 to 10 000, more preferably 300 to 4000, and very preferably 1000 to 3000 ppm by weight,
(D) 0% to 80%, preferably 10-70%, more preferably 20% to 60% by weight,
(E) 0-10 000 ppm by weight, preferably 10 to 5000 ppm by weight, preferably 20 to 1000 ppm by weight,
(F) 0-5% of components and/or additives,
with the proviso that the sum of these components, but without including that of the fillers, colorants, and pigments, is always 100% by weight.

In the coating compositions, polyisocyanate composition (A) and binder (B) are mixed with one another in a molar ratio of isocyanate groups to isocyanate-reactive groups of 0.1:1 to 10:1, preferably 0.2:1 to 5:1, more preferably 0.3:1 to 3:1, very preferably 0.5:1 to 2:1, more particularly 0.8:1 to 1.2:1, and especially 0.9:1 to 1.1:1, the incorporation, by mixing, of further, typical coatings constituents being a further, optional possibility, and the resulting mixture is applied to the substrate.

Here there may optionally be a premixing, and optionally storage of a polyisocyanate and/or of a polyol component, e.g.,
(A) at least one polyisocyanate obtainable by reacting at least one monomeric isocyanate,
(C) at least one imidazolium salt according to any of claims 1 and 5 to 8,
(D) optionally at least one solvent,
(E) optionally at least one urethanization catalyst other than (C), and
(F) optionally other, typical coatings components and/or additives.

This premix is then mixed with the polyol component (B) shortly before application to the substrate.

Or alternatively:
(B) at least one compound which has at least two isocyanate-reactive groups, a number-average molecular weight Mn of at least 1000 g/mol, and an OH number of 40 to 350 mg KOH/g,
(C) at least one imidazolium salt according to any of claims 1 and 5 to 8,
(D) optionally at least one solvent,
(E) optionally at least one urethanization catalyst other than (C), and
(F) optionally other, typical coatings components and/or additives.

This premix is then mixed with the polyisocyanate component (A) shortly before application to the substrate.

"Shortly before application" here means that premix and missing component are mixed with one another in a time period prior to application to the substrate within which trouble-free processability is ensured—that is, the coating composition continues to be fluid and amenable to application. The period of time is of course less than the gel time.

Subsequently the coating-material mixture is cured at ambient temperature to 150° C.

In one preferred variant the coating-material mixture is cured at 20 to 80° C., more preferably to 60° C. (e.g., for refinish applications or for large objects which are difficult to place inside an oven).

In another preferred application, the coating-material mixture is cured at 110-150° C., preferably at 120-140° C. (e.g., for OEM applications).

By "curing" in the context of the present invention is meant the generation of a tack-free coating on a substrate, by the heating of the coating composition that has been applied to the substrate, at the temperature indicated above, for at least until at least the desired tack-free state has been reached.

A coating composition in the context of the present specification is a mixture of at least components (A) and (B), which is intended for coating at least one substrate for the purpose of forming a film and, after curing, a tack-free coating.

The substrates are coated by typical methods known to the skilled worker, with at least one coating composition being applied in the desired thickness to the substrate to be coated, and the volatile constituents of the coating composition that are optionally present being removed, optionally with heating. This operation may if desired be repeated one or more times. Application to the substrate may take place in a known way, as for example by spraying, trowelling, knifecoating, brushing, rolling, roller coating, flow coating, laminating, injection backmolding or coextruding.

The thickness of a film of this kind for curing may be from 0.1 μm up to several mm, preferably from 1 to 2.000 μm, more preferably 5 to 200 μm, very preferably from 5 to 60 μm (based on the coating material in the state in which the solvent has been removed from the coating material).

Additionally provided by the present invention are substrates coated with a multicoat paint system of the invention.

Polyurethane coating materials of this kind are especially suitable for applications requiring particularly high application reliability, exterior weathering resistance, optical qualities, solvent resistance, chemical resistance, and water resistance.

The two-component coating compositions and coating formulations obtained are suitable for coating substrates such as wood, wood veneer, paper, cardboard, paperboard, textile, film, leather, nonwoven, plastics surfaces, glass, ceramic, mineral building materials, such as molded cement blocks and fiber-cement slabs, or metals, which in each case may optionally have been precoated or pretreated.

Coating compositions of this kind are suitable as or in interior or exterior coatings, i.e., in those applications where there is exposure to daylight, preferably of parts of buildings, coatings on (large) vehicles and aircraft, and industrial applications, utility vehicles in agriculture and construction, decorative coatings, bridges, buildings, power masts, tanks, containers, pipelines, power stations, chemical plants, ships, cranes, posts, sheet piling, valves, pipes, fittings, flanges, couplings, halls, roofs, and structural steel, furniture, windows, doors, wood block flooring, can coating, and coil coating, for floor coverings, such as in parking levels or in hospitals, and in automotive finishes, as OEM and refinish.

Coating compositions of this kind are used preferably at temperatures between ambient temperature to 80° C., preferably to 60° C., more preferably to 40° C. The articles in question are preferably those which cannot be cured at high temperatures, such as large machines, aircraft, large-capacity vehicles, and refinish applications.

In particular the coating compositions of the invention are used as clearcoat, basecoat, and topcoat material(s), primers, and surfacers.

The present invention further provides for the use of imidazolium ions of formula (I) as catalysts for the curing of mixtures comprising at least one polyisocyanate and at least one compound which contains isocyanate-reactive groups.

EXAMPLES

Joncryl® 507, an acrylate-based polyol from BASF SE with an OH number of 140 mg KOH/g (80% in butyl acetate), was mixed in stoichiometric proportion with a 1,6-hexamethylene diisocyanate-based isocyanurate (Basonat® HI 100 from BASF SE, NCO content 22.0%) and the mixture was adjusted with butyl acetate to an application viscosity of 20 sec flow time from the DIN4 cup. For the testing of the gel time, 0.5% by weight of the catalyst (based on the overall formulation) was added; for the testing of the pendulum hardness, 0.2% by weight of the catalyst was added. In the case of the comparative experiment with DBTL, the greater activity of DBTL meant that smaller quantities of catalyst were added: 0.025% each for the gel time and for the pendulum hardness. The gel time in the comparative test with DBTL is comparable with that of the inventive examples. Through the choice of the same quantity of DBTL for gel time and pendulum hardness, it can be assumed that the pendulum hardness with DBTL, on account of accelerated curing, will in fact in relative terms be better than if the amount were to be reduced in line with the inventive examples.

The solid products 1,3-diisopropylimidazolium acetate and 1,2,3,4,5-pentamethylimidazolium acetate were used in principle as 10% strength solutions in acetone.

In the tables below, unless indicated otherwise, the initial mass of the coating-material components is specified in grams; percentages in this specification, unless indicated otherwise, relate to % by weight.

The gel time of the catalysts employed was tested at 23° C. The parameter determined was the time taken for the batch to undergo gelling right through.

Film thicknesses of all coating materials were 35-45 micrometers (based on the dry coating film).

The pendulum hardness of the coating materials below (Table 1) was tested after baking at 60° C. for 30 minutes in accordance with DIN 53 157 and storage at 23° C. for 24 hours.

1-Ethyl-3-methylimidazolium is abbreviated below to EMIM.

TABLE 1

|  | Comp. 1 | Comp. 2 | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- | --- |
| Basonat HI 100 | 5.72 | 5.72 | 5.72 | 5.72 | 5.72 | 5.72 | 5.72 | 5.72 | 5.72 | 5.72 |
| Joncryl 507 | 15.0 | 15.0 | 15.0 | 15.0 | 15.0 | 15.0 | 15.0 | 15.0 | 15.0 | 15.0 |
| Butyl acetate | 7.6 | 7.6 | 7.6 | 7.6 | 7.6 | 7.6 | 7.6 | 7.6 | 7.6 | 7.6 |
| DBTL |  | 0.025/0.025 |  |  |  |  |  |  |  |  |
| EMIM octanoate |  |  | 0.142/0.057 |  |  |  |  |  |  |  |
| EMIM nonanoate |  |  |  | 0.142/0.057 |  |  |  |  |  |  |
| EMIM isononanoate |  |  |  |  | 0.142/0.057 |  |  |  |  |  |
| 1,3-Diethylimidazolium acetate |  |  |  |  |  | 0.142/0.057 |  |  |  |  |
| 1,3-Dihexylimidazolium acetate |  |  |  |  |  |  | 0.142/0.057 |  |  |  |
| 1,3-Di-n-butylimidazolium acetate |  |  |  |  |  |  |  | 0.142/0.057 |  |  |
| 1,3-Diisopropyl-imidazolium acetate |  |  |  |  |  |  |  |  | 1.415/0.566 |  |
| 1,2,3,4,5-Pentamethyl-imidazolium acetate |  |  |  |  |  |  |  |  |  | 1.415/0.566 |
| Gelling time (h:min) | >7 days | 0:39 | 1:14 | 1:18 | 1:13 | 1:06 | 1:55 | 1:38 | 1:09 | 1:03 |
| Pendulum hardness (swings) | Sticks | 36 | 55 | 57 | 58 | 68 | 50 | 50 | 66 | 86 |
| Coating appearance | OK | OK | OK | OK | OK | OK | OK | OK | OK | OK |

With comparable gelling times of approximately 1:00-1:20 hours, the coating material of the uncatalyzed comparative example sticks.

The comparative example with DBTL as catalyst has a pendulum hardness which is lower than that of the examples with imidazolium carboxylates as catalyst. The later at room temperature exhibit better curing behavior than with DBTL as catalyst.

Rapid curing at low temperatures is important for a large number of coating-material applications. On the one hand, the film surface remains cleaner (dust dry, cotton wool test see below). Moreover, the storage time until further processing is accelerated. The components can be taken hold of or stacked at an earlier point in time. An alternative option is to carry out curing at lower temperatures, thus saving on energy.

In a second series of experiments, again Joncryl® 507 was mixed in stoichiometric proportion with the 1,6-hexamethylene diisocyanate-based isocyanurate (Basonat® HI 100 from BASF SE, NCO content 22.0%) and the mixture was adjusted with butyl acetate to an application viscosity of 20 sec flow time from the DIN4 cup. In this case the gel time was adjusted using the catalysts to approximately four hours (amounts relative to the overall formulation). The nonvolatiles content was 62.6%, the flow time approximately 20 seconds. The coating materials were cured at 23+/−2° C., 50+/−5% atmospheric humidity (standard conditions 23/50).

In the experiments of the third series, on curing at 40° C. with subsequent storage at room temperature, it is found that the pendulum hardnesses of the examples with the imidazolium catalysts (experiments 9B-18B) are still much better 24

TABLE 2

Curing at room temperature:

| | Example | | | | | | | | | | |
|---|---|---|---|---|---|---|---|---|---|---|---|
| | 9 | 10 | 11 | 12 | 13 | 14 | 15 | 16 | 17 | 18 | Comp. 3 |
| Amount of catalyst [%] | 0.20 | 0.225 | 0.225 | 0.225 | 0.225 | 0.20 | 0.30 | 0.275 | 0.225 | 0.175 | 0.006 |
| Basonat HI 100 | 11.43 | 11.43 | 11.43 | 11.43 | 11.43 | 11.43 | 11.43 | 11.43 | 11.43 | 11.43 | 11.43 |
| EMIM acetate | 0.11 | | | | | | | | | | |
| EMIM heptanoate | | 0.13 | | | | | | | | | |
| EMIM octanoate | | | 0.13 | | | | | | | | |
| EMIM nonanoate | | | | 0.13 | | | | | | | |
| EMIM isononanoate | | | | | 0.13 | | | | | | |
| 1,3-Diethylimidazolium acetate | | | | | | 0.11 | | | | | |
| 1,3-Dihexylimidazolium acetate | | | | | | | 0.17 | | | | |
| 1,3-Di-n-butylimidazolium acetate | | | | | | | | 0.16 | | | |
| 1,3-Diisopropyl-imidazolium acetate (10% in acetone) | | | | | | | | | 1.3 | | |
| 1,2,3,4,5-Pentamethyl-imidazolium acetate (10% in acetone) | | | | | | | | | | 1.00 | |
| DBTL | | | | | | | | | | | 0.035 |
| Joncryl 507 | 30.00 | 30.00 | 30.00 | 30.00 | 30.00 | 30.00 | 30.00 | 30.00 | 30.00 | 30.00 | 30.00 |
| Butyl acetate | 15.20 | 15.25 | 15.25 | 15.25 | 15.25 | 15.20 | 15.25 | 15.25 | 14.10 | 14.30 | 15.15 |
| Gelling time (h:min) | 03:24 | 03:30 | 03:45 | 03:54 | 03:51 | 03:30 | 03:52 | 03:20 | 03:14 | 03:53 | 04:06 |
| Coating appearance | clear | clear | clear | clear | clear | clear | clear | clear | clear | clear | clear |
| Pendulum hardness (swings): | | | | | | | | | | | |
| 4 hours | 5 | 3 | 3 | 3 | 2 | 5 | 4 | 4 | 4 | 2 | 3 |
| 6 hours | 25 | 15 | 11 | 8 | 8 | 20 | 18 | 14 | 21 | 5 | 3 |
| 24 hours | 42 | 49 | 53 | 53 | 52 | 42 | 46 | 49 | 41 | 47 | 6 |

In the experiments of the second series, with gel times of around four hours, it is found on curing at room temperature that the pendulum hardnesses of the examples with the imidazolium catalysts are better after six to twenty-four hours of curing than in the case of the reference with DBTL.

A third series of experiments was carried out similarly to the second, but with curing for 30 minutes at 40° C. (examples 9B to 18B and comparative example 3B, see Table 3). The coatings were stored for 24 hours under standard conditions 23/50. The composition of the examples and of the comparative example corresponds to that of the specimens of Table 2.

hours after the 40° C. cure than in the case of the comparative experiment with DBTL.

A fourth series of experiments was carried out in the same way as for the second, but with curing for 30 minutes at 60° C. (examples 9C to 18C and comparative example 3C, see Table 4). The coatings were subsequently stored under standard conditions 23/50 for 24 hours. The composition corresponds to that of the specimens of Table 2.

TABLE 3

Curing at 40° C.

| Pendulum hardness | Example | | | | | | | | | | |
|---|---|---|---|---|---|---|---|---|---|---|---|
| (swings): | 9B | 10B | 11B | 12B | 13B | 14B | 15B | 16B | 17B | 18B | Comp. 3B |
| +24 hours | 62 | 72 | 73 | 75 | 71 | 71 | 72 | 67 | 65 | 76 | 8 |

TABLE 4

Curing at 60° C.

| Pendulum hardness | Example | | | | | | | | | | |
|---|---|---|---|---|---|---|---|---|---|---|---|
| (swings) | 9C | 10C | 11C | 12C | 13C | 14C | 15C | 16C | 17C | 18C | Comp. 3C |
| +24 hours | 70 | 71 | 71 | 68 | 70 | 69 | 68 | 65 | 84 | 84 | 15 |
| +7 days | 104 | 100 | 101 | 104 | 100 | 99 | 99 | 88 | 100 | 102 | 88 |
| +7 days + 15 h 60° C. | 106 | 103 | 104 | 104 | 102 | 100 | 101 | 89 | 103 | 106 | 100 |

In the experiments of the fourth series it was found that the pendulum hardnesses in the case of the imidazolium catalysts (experiments 9C-18C) are much better still 24 hours after the 60° C. cure than in the case of comparative experiment comp. 3C with DBTL.

In the experiments of the fifth series (see Table 5), specimens analogous to the above batches of Table 2 were cured at 23° C. The curing behavior was determined in the form of the cotton wool test, the sand drying and the through-drying.

The determination of the curing behavior by the cotton wool test was carried out at 23° C. The parameter determined was the time until contacting the freshly coated material with cotton wool left no visible effect on the film surface. This measurement is frequently equated with the dust-dry time.

The determination of the curing behavior in accordance with the sand test and the through-drying took place under standard conditions 23/50. For the measurement of the through-drying time, two small wheels run over a freshly coated metal sheet. The wheels have a diameter of 19-20 mm and a width of 0.3 mm. By placing a hopper (107-117 g intrinsic weight with 60-80 g of sand) on the pairs of wheels, with a relative motion, a broad indentation is obtained in the coating film. Directly following its application, the coating is drawn along beneath the wheels at a speed of 1 cm/h. The coating film has reached the through-drying time as soon as no significant track can be seen any longer or when the track is interrupted for a number of centimeters. Shorter through-drying times are good, longer times bad.

Sand-dry time, in the same test, is the time span following application of the coating material after which sand no longer remains adhering to the coating under its own weight when sand is brushed very carefully over the coating using a brush. Shorter sand-drying times are good, longer times bad.

TABLE 5

Cotton wool test, sand drying, through-drying, curing at 23° C.

| | Example | | | | | |
|---|---|---|---|---|---|---|
| | 9D | 11D | 14D | 17D | 18D | Comp. 3D |
| Gelling time 23° C. [h:min] | 3:35 | 3:43 | 3:39 | 3:32 | 4:04 | 4:11 |

TABLE 5-continued

Cotton wool test, sand drying, through-drying, curing at 23° C.

| | Example | | | | | |
|---|---|---|---|---|---|---|
| | 9D | 11D | 14D | 17D | 18D | Comp. 3D |
| Cotton wool test (minutes) | 150 | 195 | 165 | 155 | 180 | >480 |
| Sand drying (hours) | 2.5 | 3.0 | 2.5 | 2.5 | 3.25 | 11.25 |
| Through-drying (hours) | 4.5 | 4.25 | 4.0 | 4.0 | 5.25 | 15.75 |

In all drying times, the example specimens are significantly better than the comparative example comp. 3D with DBTL as catalyst.

For the experiments of the sixth series (see Table 6), specimens similar to the batches above in Table 2 were cured at 60° C. for thirty minutes. After twenty-four hours at room temperature, the cross-cut test, acetone test and a scratch test were conducted. Comparative example comp. 4E corresponds to comparative example comp. 3E, but contains about four times the amount of DBTL catalyst.

The adhesion with cross-cut was determined in accordance with DIN 53151. A rating of 0 identifies the best rating, a rating of 5 the worst.

Acetone double-rub test: a cotton pad impregnated with acetone was rubbed back and forth (double rubs) over the cured coating by hand until the coating film had been rubbed through down to the metal panel. The number of double rubs required to achieve this is reported. At a hundred rubs, the experiment was discontinued.

The scratch resistance was determined as follows: a fitter's hammer weighing 500 g had a fiber web (Scotchbrite®, 7448 type S ultrafine) attached to its head using double-sided adhesive tape. The hammer was held by two fingers at the shaft end, and was moved back and forth over the coating film with uniform strokes, without tipping and without additional application of force, in a line. After 50 back-and-forth strokes, followed by heat treatment for 60 minutes in a forced-air oven at 60° C. (reflow) and storage for 4 h under standard conditions 23/50, a determination was made of the gloss transverse to the direction of abrasion. The fiber web was replaced by a new web after the test.

The gloss was measured with a Micro TRI-Gloss gloss meter at an incident angle of 60°.

TABLE 6

Cross-cut, acetone test, scratch test at 60° C. curing

| | Example | | | | | | |
|---|---|---|---|---|---|---|---|
| | 9E | 11E | 14E | 17E | 18E | Comp. 3E | Comp. 4E |
| Amount of catalyst [%] | 0.20 | 0.225 | 0.20 | 0.225 | 0.175 | 0.006 | 0.025 |
| Gelling time 23° C. [h:min] | 3:35 | 3:43 | 3:39 | 3:32 | 4:04 | 4:11 | 0:41 |
| Cross-cut (rating) | 0 | 0 | 0 | 0 | 0 | 0 | 0 |

TABLE 6-continued

Cross-cut, acetone test, scratch test at 60° C. curing

| | Example | | | | | | |
|---|---|---|---|---|---|---|---|
| | 9E | 11E | 14E | 17E | 18E | Comp. 3E | Comp. 4E |
| Acetone test (double rubs) | >100 | >100 | >100 | >100 | >100 | >100 | >100 |
| Scratch test, gloss direct | 99 | 99 | 99 | 99 | 98 | 98 | 98 |
| Gloss after 50 back-and-forth strokes | 8 | 9 | 7 | 20 | 15 | 3 | 13 |
| Gloss after reflow | 9 | 9 | 7 | 20 | 18 | 4 | 11 |

Cross-cut, acetone test and initial gloss of the examples with imidazolium catalysts match those of the system catalyzed with DBTL, comp. 3E. The scratch resistances of the batches with imidazolium catalysts are significantly better at all measurement points, for all samples, than in comparative example comp. 3E with DBTL.

In the case of comparative example comp. 4E, with a significantly higher amount of DBTL catalyst than in comparative example comp. 3E, and hence a very significantly reduced gel time, there is an improvement in the scratch resistance, but the scratch resistance is still much poorer than in examples 17E and 18E, and only marginally better than in examples 9E, 11E and 14E.

In the experiments of the seventh series, specimens analogous to the above batches of Table 2 were cured at 80° C. for thirty minutes. After a further twenty-four hours at room temperature, pendulum hardness, Erichsen cupping, cross-cut, acetone test, scratch resistance and an etch test were conducted.

The Erichsen cupping was determined by analogy with DIN 53156, in millimeters. The Erichsen cupping was determined by pressing in a metal ball until the coating ruptured. High values denote high flexibility.

Etch test with sulfuric acid: using a pipette, a 25 μm drop of sulfuric acid was applied to a coating material cured at a predetermined temperature (in this case 30 minutes at 80 or 130° C., see Tables 7 and 8) on a metal gradient oven panel, and this coated metal panel was heated in the gradient oven at 30-75° C. for 30 minutes. Thereafter the metal panel was washed off with water and dried. The parameter reported is the lowest temperature at which inspection showed initial etching on the coating.

TABLE 7

Pendulum hardness, Erichsen cupping, cross-cut, acetone test, scratch resistance and etch test after 30 minutes of curing at 80° C. and after 24 hours at 23° C.

| | Example | | |
|---|---|---|---|
| | 17F | 18F | Comp. 3F |
| Gel time 23° C.[h:min] | 3:28 | 3:47 | 4:01 |
| Pendulum hardness [swings] | 82 | 88 | 39 |
| Erichsen cupping [mm] | >9.0 | >9.0 | >9.0 |
| Cross-cut [rating] | 1 | 1.5 | 5 |
| Acetone test [double rubs] | >100 | >100 | >100 |
| Scratch test, gloss direct | 98 | 99 | 99 |
| Gloss after 50 back-and-forth strokes | 9 | 20 | 5 |
| Gloss after reflow | 9 | 27 | 6 |
| Etch test, initial etching [° C.] | 45.5 | 49.0 | 41.5 |

Erichsen cupping and acetone test are the same for all examples and the comparative example.

The pendulum hardness, the scratch test after 50 back-and-forth strokes and reflow, the etch test and the cross-cut of examples 17F and 18F are significantly better than those of the coating cured with DBTL.

In the experiments of the eighth series, Joncryl® 911, an acrylate-based polyol from BASF SE with an OH number of 70 mg KOH/g (77% in butyl acetate), was used in stoichiometric proportion with the 1,6-hexamethylene diisocyanate-based isocyanurate (Basonat® HI 100 from BASF SE, NCO content 22.0%) in a pigmented system, which was adjusted with butyl acetate to an application viscosity of 20 sec flow time from the DIN4 cup. The nonvolatiles content was 70%.

For the experiments, first of all a mill base of a polyol component was prepared:

| Component | Amount (g) | Product description |
|---|---|---|
| Joncryl 911 | 54.72 | acrylate-based polyol |
| BYK 320 | 0.29 | solution of a polyether-modified polymethylalkylsiloxane; silicone surface additive with low reduction in surface tension, BYK-Chemie GmbH |
| BYK 333 | 0.30 | polyether-modified polydimethylsiloxane; raises the surface smoothness sharply and significantly improves substrate wetting, BYK-Chemie GmbH |
| TiPure R 960 | 43.72 | titanium dioxide for coatings, DuPont |
| Butyl acetate | 15.97 | |

This mill base was subsequently mixed with the polyisocyanate and catalyst, and cured.

| | Example | | |
|---|---|---|---|
| Component | 19 Amount (g) | 20 Amount (g) | Comp. 5 Amount (g) |
| Amount of catalyst [%] | 0.225 | 0.175 | 0.0063 |
| Basonat HI 100 | 4.37 | 4.37 | 4.37 |
| EMIM octanoate | 0.135 | | |
| 1,2,3,4,5-pentamethylimidazolium acetate (10% in acetone) | | 1.047 | |
| DBTL | | | 0.0374 |
| Mill base | 50.00 | 50.00 | 50.00 |

In Table 8 below, experimental results are described with the product compositions and above coating materials after 30 minutes of curing at 60° C. and 24 hours under standard conditions 23/50.

TABLE 8

Cross-cut, acetone test, scratch test after 30 minutes of curing at 60° C. and 24 hours under standard conditions 23/50

|  | Example | | |
|---|---|---|---|
|  | 19 | 20 | Comp. 5 |
| Cross-cut (rating) | 0 | 0 | 0 |
| Acetone test | 100 | 100 | 100 |
| Scratch test, gloss direct | 96 | 96 | 95 |
| Gloss after 50 back-and-forth strokes | 22 | 17 | 12 |
| Gloss after reflow | 23 | 17 | 15 |

In the scratch test the two examples are better. Cross-cut, acetone test and gloss of the two examples correspond to that of the comparative example with DBTL.

In table 9 below, results of experiments with the following product compositions on curing at room temperature under standard conditions 23/50 are described.

|  | Example | | | | | |
|---|---|---|---|---|---|---|
|  | Comp. 6 | Comp. 7 | Comp. 8 | 21 | 22 | 23 |
| Amount of catalyst [%] | 0.006 | 0.15 | 0.006 | 0.169 | 0.225 | 0.225 |
| Basonat HI 100 | 7.6 | 7.6 | 7.6 | 7.6 | 7.6 | 7.6 |
| DBTL (1% in BuAc) | 0.024 |  | 0.024 |  |  |  |
| Tetrabutylammonium acetate (10% in acetone) |  | 0.57 |  |  |  |  |
| 1-Ethyl-2,3-dimethyl-imidazolium acetate (3% in Joncryl 507) |  |  |  | 2.145 |  |  |
| 1,3-Diethylimidazolium acetate (100%) |  |  |  |  | 0.0857 |  |
| 1,3-Diethylimidazolium octanoate (100%) |  |  |  |  |  | 0.0857 |
| Joncryl 507 | 20.00 | 20.00 | 20.00 | 17.85 | 20.00 | 20.00 |
| Butyl acetate | 10.3 | 10.3 | 10.3 | 10.3 | 10.3 | 10.3 |
| Gelling time 23° C. [h:min] | 04:06 | 4:06 |  | 3:29 | 3:31 | 4:33 |
| Cotton wool test [min] | >500 | 305 |  | 235 | 225 | 290 |
| Sand drying [hours] | >24 | 6 |  | 4.75 | 4.0 | 4.75 |
| Through-drying [hours] | 25.25 | 5.25 |  | 5.0 | 3.75 | 4.75 |
| Pendulum hardness [swings]: | | | | | | |
| 5 hours |  |  |  | 2 | 11 | 10 | 9 |
| 6 hours | 2 | 4 |  |  |  |  |
| 24 hours | 15 | 45 |  |  |  |  |
| 2 days |  |  |  | 32 | 37 | 37 | 36 |

The reference with tetrabutylammonium acetate (comp. 7) is very poor in sand drying and through-drying by comparison with DBTL (comp. 6) and with the inventive examples of table 5.

1-Ethyl-2,3-dimethylimidazolium acetate; 1,3-diethylimidazolium acetate and 1,3-diethylimidazolium octanoate are better relative to DBTL as reference, in terms of drying and the early development of pendulum hardness.

The invention claimed is:

1. A method of coating a substrate, the method comprising:
applying to the substrate in a desired thickness at least one coating composition,
optionally drying the at least one coating composition by at least partly removing a volatile constituent, and
curing the at least one coating composition,
wherein
the at least one coating composition comprises:
(A) a polyisocyanate comprising, in reacted form, a monomeric isocyanate,
(B) a compound comprising at least two isocyanate-reactive groups, and having a number-average molecular weight Mn of at least 1000 g/mol and an OH number of 40 to 350 mg KOH/g,
(C) an imidazolium salt as a urethanization catalyst,
(D) optionally a solvent,
(E) optionally a urethanization catalyst other than (C), and
(F) optionally another coating component or additive; and
the imidazolium salt (C) has a formula

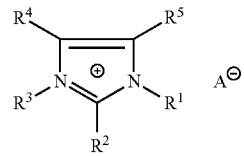

wherein:
$R^1$ and $R^3$ each independently are an organic radical comprising 1 to 20 C atoms,
$R^2$, $R^4$ and $R^5$ each independently are an H atom or an organic radical comprising up to 20 C atoms, and
$A^-$ is an anion.

2. The method of claim 1, wherein the polyisocyanate (A) is a (cyclo)aliphatic polyisocyanate.

3. The method of claim 1, wherein the polyisocyanate (A) further comprises one selected from the group consisting of an isocyanurate group, a biuret group, a urethane group, and an allophanate group.

4. The method of claim 1, wherein the compound (B) is selected from the group consisting of a polyacrylate polyol, a polyester polyol, a polyurethane polyol, a polycarbonate polyol, and a polyether polyol.

5. The method of claim 1, wherein $R^1$ and $R^3$ in the imidazolium salt (C) are each independently a methyl, an ethyl, an isopropyl, an n-propyl or an n-butyl group.

6. The method of claim 1, wherein $R^2$, $R^4$, and $R^5$ in the imidazolium salt (C) are each independently a hydrogen atom or a $C_1$ to $C_{10}$ alkyl group.

7. The method of claim 1, wherein $R^1$ to $R^5$ in the imidazolium salt (C) are each independently a $C_1$ to $C_{10}$ alkyl group.

8. The method of claim 1, wherein the anion $A^-$ is selected from the group consisting of acetate, propionate, isopropanoate, 2,2-dimethylpropionate, n-butanoate, isobutanoate, sec-butanoate, tert-butanoate, n-pentanoate, n-hexanoate, n-heptanoate, n-octanoate, isooctanoate, n-nonanoate, isononanoate, n-decanoate, n-dodecanoate, tetradecanoate, hexadecanoate, stearate, and n-eicosanoate.

9. The method of claim 1, wherein the at least one coating composition comprises at least one solvent (D) selected from the group consisting of an ester, an alkoxyester and an aromatic solvent.

10. The method of claim 1, further comprising:
shortly before the applying to the substrate, mixing a premix comprising
(A) the polyisocyanate comprising, in reacted form, a monomeric isocyanate,
(C) the imidazolium salt as a urethanization catalyst,
(D) optionally the solvent,
(E) optionally the urethanization catalyst other than (C),
(F) optionally the other coating component or additive, and
optionally at least one stabilizer selected from the group consisting of a sterically hindered phenol, a phosphite, a phosphonite, a phosphonate, a secondary aromatic amine, and a Bronsted acid
with
(B) the compound comprising at least two isocyanate-reactive groups, and having a number-average molecular weight Mn of at least 1000 g/mol and an OH number of 40 to 350 mg KOH/g.

11. The method of claim 1, further comprising:
shortly before the applying to the substrate, mixing a premix comprising
(B) the compound comprising at least two isocyanate-reactive groups, and having a number-average molecular weight Mn of at least 1000 g/mol, and an OH number of 40 to 350 mg KOH/g,
(C) the imidazolium salt as a urethanization catalyst,
(D) optionally the solvent,
(E) optionally the urethanization catalyst other than (C), and
(F) optionally the other coating component or additive,
with
(A) the polyisocyanate comprising, in reacted form, a monomeric isocyanate.

12. The method of claim 1, wherein the at least one coating composition comprises (D) a solvent.

13. The method of claim 1, wherein the at least one coating composition comprises (E) a urethanization catalyst other than (C).

14. The method of claim 1, wherein the at least one coating composition comprises (D) a solvent and (E) a urethanization catalyst other than (C).

15. The method of claim 1, wherein the polyisocyanate (A) has an average NCO functionality of 1.8 to 8.

16. The method of claim 1, wherein the compound (B) comprises 3 to 7 isocyanate-reactive groups.

17. The method of claim 1, wherein the imidazolium salt (C) comprises an imidazolium ion selected from the group consisting of 3-ethyl-1-methylimidazolium, 3-n-butyl-1-methylimidazolium, 1,3-diethylimidazolium; 1,3-dihexylimidazolium, 1,3-di-n-butylimidazolium, and 1,3-diisopropylimidazolium, and 1,2,3,4,5-pentamethylimidazolium.

18. The method of claim 1, wherein the polyisocyanate (A) comprises, in reacted form, a monomeric (cyclo)aliphatic diisocyanate.

19. A coating material, comprising
(A) a polyisocyanate comprising, in reacted form, a monomeric isocyanate,
(B) a compound comprising at least two isocyanate-reactive groups, and having a number-average molecular weight Mn of at least 1000 g/mol and an OH number of 40 to 350 mg KOH/g,
(C) an imidazolium salt as a urethanization catalyst,
(D) optionally a solvent,
(E) optionally a urethanization catalyst other than (C), and
(F) optionally another coating component or additive,
wherein the imidazolium salt (C) has a formula

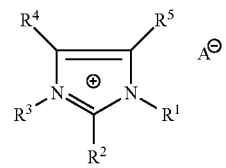

wherein:
$R^1$ and $R^3$ each independently are an organic radical comprising 1 to 20 C atoms,
$R^2$, $R^4$ and $R^5$ each independently are an H atom or an organic radical comprising up to 20 C atoms, and
$A^-$ is an anion.

20. A premix, comprising:
one selected from the group consisting of (A) and (B), wherein (A) is at least one polyisocyanate comprising, in reacted form, a monomeric isocyanate, and (B) is at least one compound comprising at least two isocyanate-reactive groups, and having a number-average molecular weight Mn of at least 1000 g/mol and an OH number of 40 to 350 mg KOH/g,
(C) an imidazolium salt as a urethanization catalyst,
(D) optionally a solvent,
(E) optionally a urethanization catalyst other than (C), and
(F) optionally another coating component or additive,
wherein
the imidazolium salt (C) has a formula

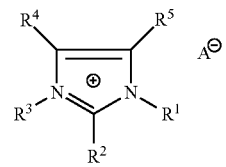

wherein:
$R^1$ and $R^3$ each independently are an organic radical comprising 1 to 20 C atoms,
$R^2$, $R^4$ and $R^5$ each independently are an H atom or an organic radical comprising up to 20 C atoms, and
$A^-$ is an anion.

* * * * *